(12) United States Patent
Singh

(10) Patent No.: US 11,822,873 B2
(45) Date of Patent: Nov. 21, 2023

(54) DOCUMENT GENERATION FROM APPLICATIONS

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 264 days.

(21) Appl. No.: 17/120,412

(22) Filed: Dec. 14, 2020

(65) Prior Publication Data
US 2022/0188504 A1 Jun. 16, 2022

(51) Int. Cl.
*G06F 3/048* (2013.01)
*G06F 40/166* (2020.01)
*G06F 40/103* (2020.01)
*G10L 15/26* (2006.01)
*G10L 15/22* (2006.01)

(52) U.S. Cl.
CPC .......... *G06F 40/166* (2020.01); *G06F 40/103* (2020.01); *G10L 15/22* (2013.01); *G10L 15/26* (2013.01)

(58) Field of Classification Search
CPC .... G06F 40/166; G06F 40/103; G06F 40/106; G06F 40/137; G06F 40/143; G06F 40/186; G10L 15/22; G10L 15/26
See application file for complete search history.

(56) References Cited

U.S. PATENT DOCUMENTS

| | | | |
|---|---|---|---|
| 2009/0172536 A1* | 7/2009 | Cheng | G06F 3/0481 715/704 |
| 2011/0173589 A1* | 7/2011 | Guttman | H04L 43/50 717/125 |
| 2016/0162168 A1* | 6/2016 | Shabazz | G06F 3/04842 715/704 |
| 2019/0324963 A1* | 10/2019 | Mano | G06F 16/2477 |
| 2022/0300396 A1* | 9/2022 | Zhai | G06F 11/3696 |

* cited by examiner

*Primary Examiner* — Aleksey Olshannikov

(57) ABSTRACT

Disclosed is a system for generating a document having a sequence of steps. A user input selecting an element of an application is received, where the user input indicates the element corresponds to a step in the sequence of steps to be represented in the document. A record is stored, where the record includes at least data representing the selected element and a sequence identifier, indicating a relative position of the step within the sequence of steps. The document is generated by using the data in the record to generate a visual portion for the step, and using the sequence identifier to determine a position of the visual portion in the document relative to another visual portion(s) representing another step(s) in the sequence of steps.

20 Claims, 22 Drawing Sheets

1. Click on Title to edit the text there
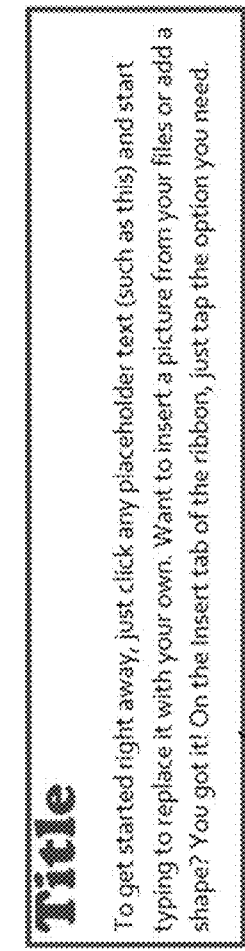
2. Click on a Style Profile to change the text style
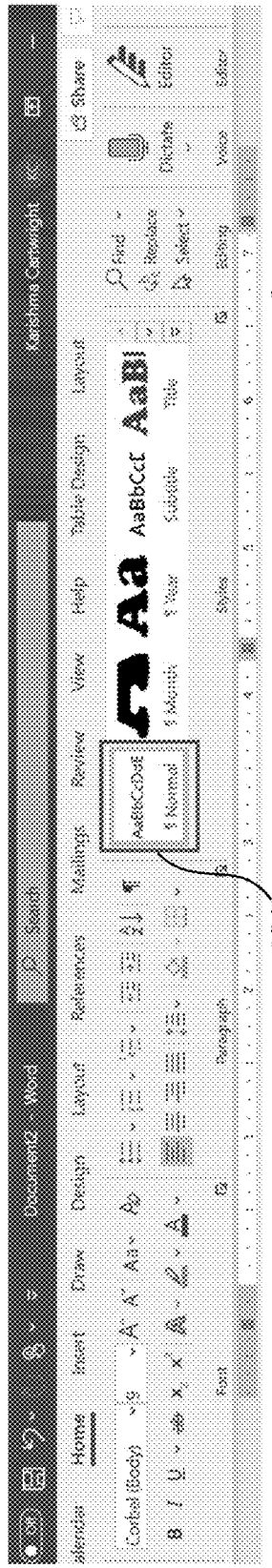
FIG. 1G

DOCUMENT GENERATION FROM APPLICATIONS

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities. One feature of the Citrix Workspace™ is a specialized embedded browser that may be used to access software-as-a-service (SaaS) or other Web-based applications.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises receiving, by a computing system, a first user input selecting at least a first element of an application, where the first user input indicates that the first element corresponds to a first step in a sequence of steps to be represented in a document. The method further comprises storing, by the computing system, a first record for the first step, where the first record includes at least a first sequence identifier, identifier indicating a relative position of the first step within the sequence of steps, and the first record includes first data representing the first element, the first sequence. The method further comprises generating, by the computing system, the document at least in part by using the first data to generate a first visual portion for the first step, and using the first sequence identifier to determine a position of the first visual portion, in the document, relative to one or more other visual portions representing one or more other steps in the sequence of steps.

In some embodiments, a method comprises receiving, by a computing system, a document representing a sequence of steps, receiving, by the computing system, a first user input enabling an edit mode for the document, and using a DOM corresponding to the document, displaying, by the computing system, a visual portion for a step represented in the document. The method further comprises receiving, by the computing system, a second user input with respect to the visual portion, updating, by the computing system, the DOM based on the second user input, generating, by the computing system, an updated document by replacing the visual portion with an updated visual portion based on the updated DOM, and storing, by the computing system, the updated document and the updated DOM.

In some disclosed embodiments, a system comprises at least one processor, and at least one computer-readable medium encoded with instructions which, when executed by the at least one processor, cause the system to receive a first user input selecting at least a first element of the application, where the first user input indicates that the first element corresponds to a first step element in a sequence of steps to be represented in a document, and identify at least a first document object model (DOM) element representing the first element. The instructions further cause the system to store a first record for the first step, where the first record includes the first DOM element and a first sequence identifier indicating a relative position of the first step within the sequence of steps, and generate the document at least in part by using the first DOM element to generate a first visual portion for the first step, and using the first sequence identifier to determine a position of the first visual portion relative to one or more other visual portions representing one or more other steps in the sequence of steps.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1G shows an example of a document with a visual portion, a markup portion and a transcript portion for multiple steps;

DETAILED DESCRIPTION

For purposes of reading the description of the various embodiments below, the following descriptions of the sections of the specification and their respective contents may be helpful:

Section A provides an introduction to example embodiments of systems for generating documents;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of systems for generating documents; and Section F describes example implementations of methods, systems/devices, and computer-readable media in accordance with the present disclosure.

Figure 1A:
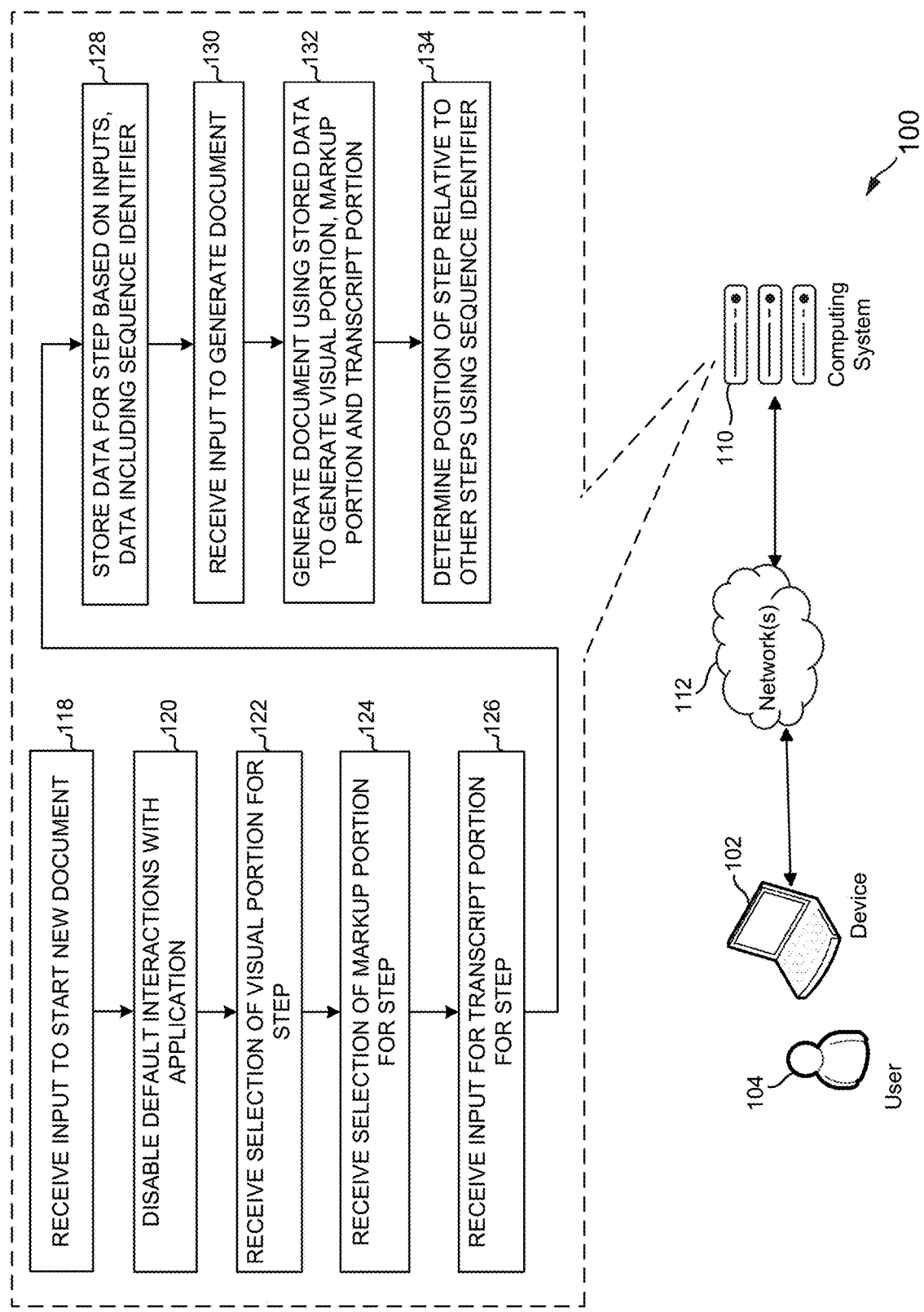
FIG. 1A is a diagram of how a system may receive user inputs with respect to an application to generate a document for the application in accordance with some embodiments.

A. Introduction to Illustrative Embodiments of Systems and Methods for Generating Documents FIG. 1A is a diagram showing an example of how a system 100 may receive inputs to generate a document (e.g., a user guide document, an instruction manual, a sales/marketing document showing features of the application, etc.) from or for an application in accordance with some embodiments. As shown, the system 100 may include a device 102 operated by a user 104 and a computing system 110. The device 102 may be a client device 202, as described in detail below in connection with FIGS. 2-4. The computing system 110 may include one or more servers 204, as described in detail below in connection with FIGS. 2-4. In some implementations, the computing system 110 may include/host a SaaS application 410 that can be accessed using an embedded browser, as described in detail below in connection with FIGS. 4A-B. The device 102 may be in communication with the computing system 110 via one or more networks 112. The network(s) 112 may correspond to one or more of the networks 206 described below in detail in connection with at least FIG. 2A.

Figure 1B:
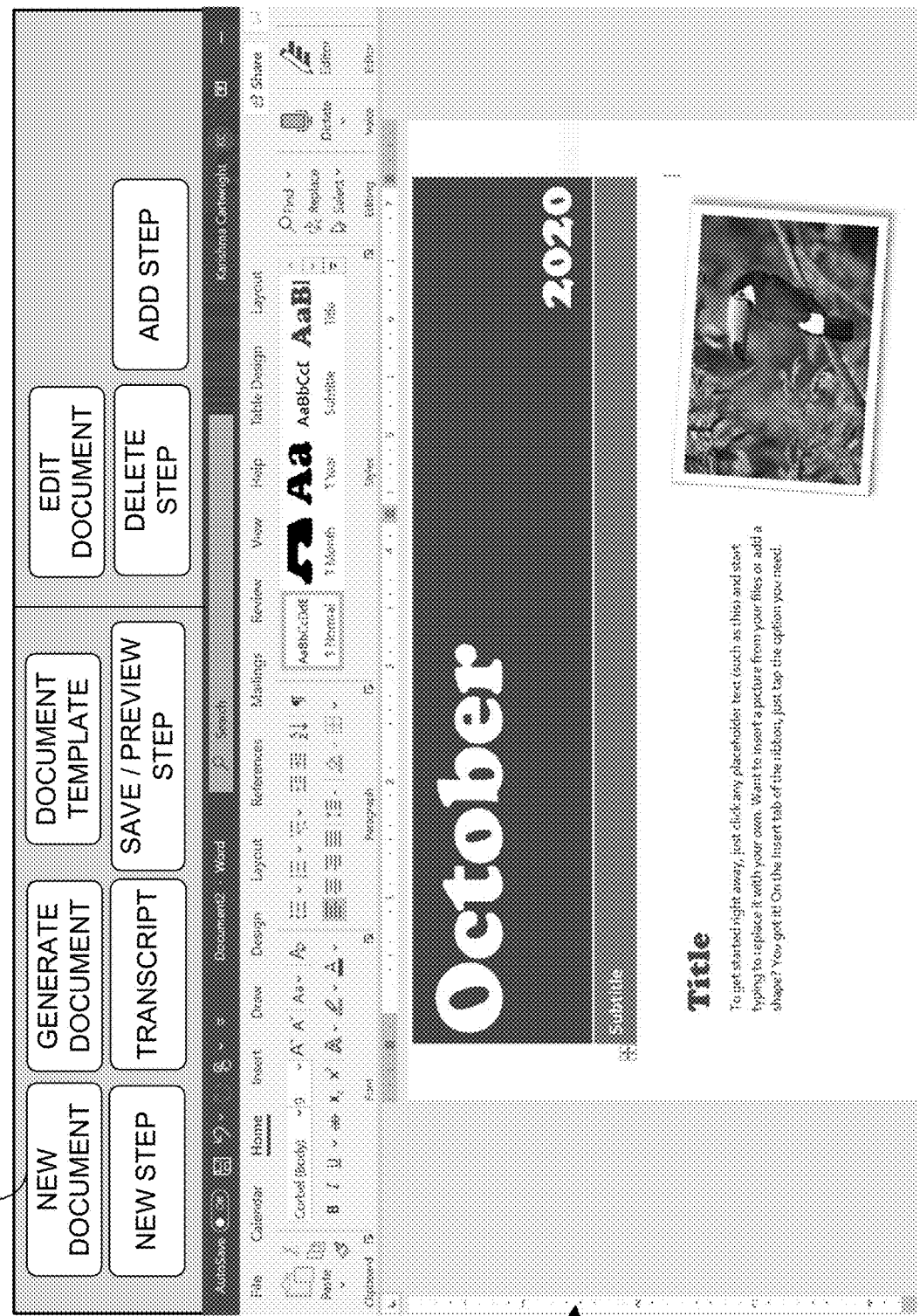
FIG. 1B shows an example of a display screen with a document generation toolbar and an application.

The user 104 may, via the device 102, launch an application (e.g., a document generation toolbox 140 shown in FIG. 1B) configured to generate a document from or for an application, for example, that is instructive on the use of an application, description of application features or other interfaces as described herein. In some implementations, the document generation toolbox application may, for example, be provided as an extension or plug-in to a web browser. In other implementations, the document generation toolbox application may be included within a specialized embedded browser included in a resource access application 424 (described below in connection with FIG. 4B). In yet other implementations, the document generation toolbox application may be accessed directly at the device 102 without a browser, such as when the application is a native or local application installed on the device. In still other implementations, the document generation toolbox application may be a functional component or module within the application for which the user wants to create a document, e.g., as a tool incorporated within such an application. After the document generation toolbox application is launched, the user 104 may provide an input to initiate creation of a new document. The application for which the user 104 wants to create a document may, in some implementations, be accessed using either a general purpose browser including the document generation toolbox plug-in or add-in or the specialized embedded browser, prior to or after launching the document generation toolbox application. In other implementations, the application for which the user 104 wants to create a document may be accessed without using a browser. FIG. 1B shows a display screen depicting outputs of both the document generation toolbox 140 and the application 150 for which the user 104 wants to create a document. As shown, the document generation toolbox 140 may cause the device 102 to present various buttons or other user interface elements that the user 104 can select/click to interact with the document generation toolbox 140. The user 104 may click a button 142, e.g., labeled "new document," to initiate creation of a new document.

As used herein, generating a document may include generating a file, generating a message (e.g., an email, a SMS message, a MMS message, etc.), generating a notification, etc. The systems and techniques described herein may be used to generate information, for an application, that may be included in a document (e.g., a word document, a pdf document, a text document, etc.), a message, a notification, etc. Additionally, the systems and techniques described herein may be used to generate documents for various purposes, including but not limited to, a user guide document providing instructions on how to use an application, a marketing/sales document referring to portions of an application, a document describing features of the application, etc. For example, the document generation toolbox 140 may be used to generate a user guide document that includes steps to be taken by a user in using the application. As another example, the document generation toolbox 140 may be used to generate a marketing/sales document that includes sections describing options for a user to purchase various portions of the application. In yet another example, the document generation toolbox 140 may be used to generate a document describing features of the application.

As shown in FIG. 1A, the system 110 may receive (at a step 118) an input, from the device 102, to start creation of the new document. In response to receiving the input, the system 110 may disable (at a step 120) default interactions with the application 150 (for which the document is being created). By disabling default interactions, the system 110 may prevent the application 150 from performing functions/actions responsive to an input received with respect to the application 150, and thereby enable creation of the document. For example, the application 150 may not perform any action when a button is clicked or a tab selected within the application 150. By disabling the default interactions, the system 110 may enable the user 104 to provide inputs selecting portions of the application 150 that are to be included in the document.

For example, a document, like a user guide, may be instructive about how to use the application, and may organize information as a sequence of steps. Step may include a visual portion illustrating a portion of the application the step is referring to. Within such a visual portion, the step may include a markup portion identifying an interface element (e.g., a button, a tab, a text field, etc.) that the step is referring to. The step may also include a transcript portion describing what action(s) should be performed for the step. Steps may be identified by or associated with a step identifier/number. Example steps 170 and 180 for a document are shown in FIG. 1G. As shown in FIG. 1G, the example step 170 may include a visual portion 172, a markup portion 174, and a transcript portion 176, and the example step 180 may include a visual portion 182, a markup portion 184, and a transcript portion 186.

Figure 1C:
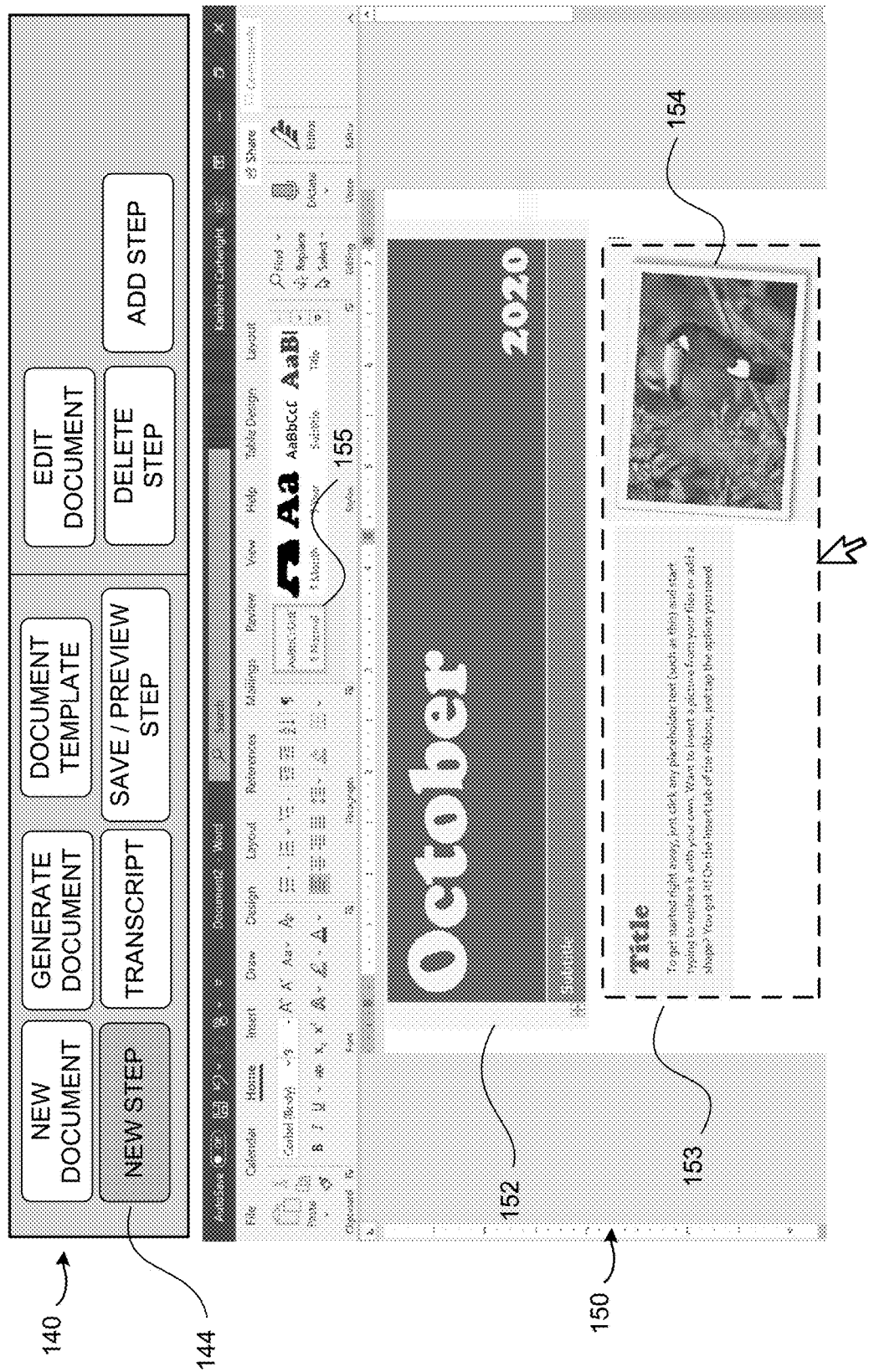
FIGS. 1C-1F show examples of a display screen showing selections of the application used to generate the document.

Referring again to FIG. 1A, the system 110 may receive inputs from the user 104 indicating a visual portion 172, a markup portion 174 and/or a transcript portion 176 for a step 170 of the document to be generated. The user 104 may click a button 144, e.g., labeled "new step", shown in FIG. 1C. Clicking of the button 144 may cause portions of the application 150 to be highlighted, for example, portion 152, 153, 154, and 155 may be highlighted, to indicate to the user 104 that these portions are selectable by the user 104 to include as a visual portion and/or a markup portion for a step in the document. The system 110 may receive (at a step 122) selection of a visual portion 172 for the step 170, where the selection includes one or more interface elements of the application 150. The user 104 may select the portions 153 and 154 of the application 150, as shown in FIG. 1C with a dashed box. In some implementations, such selection may, for example, involve clicking on one or more interface elements displayed in the portions 153 and 154. In other implementations, such selection may additionally or alternatively involve a click-and-drag operation, where the user 104 may click near the interface element in the portion 153, and while holding down the mouse button, may drag the cursor to another location near the interface element in the portion 154, to select everything from the beginning to the end of the drag, such that the portions 153 and 154 are selected. In other implementations, such selection may additionally or alternatively involve the user 104 first hovering using the mouse over the interface elements, where the hovering input event causes the interface element to be highlighted. Clicking of the foregoing highlighted interface element using the mouse may cause selection of the interface element. In some implementations, such selection may be performed using a voice input. For example, the user 104 may say "select Title label for visual portion" or "select image for visual portion."

Figure 1D:
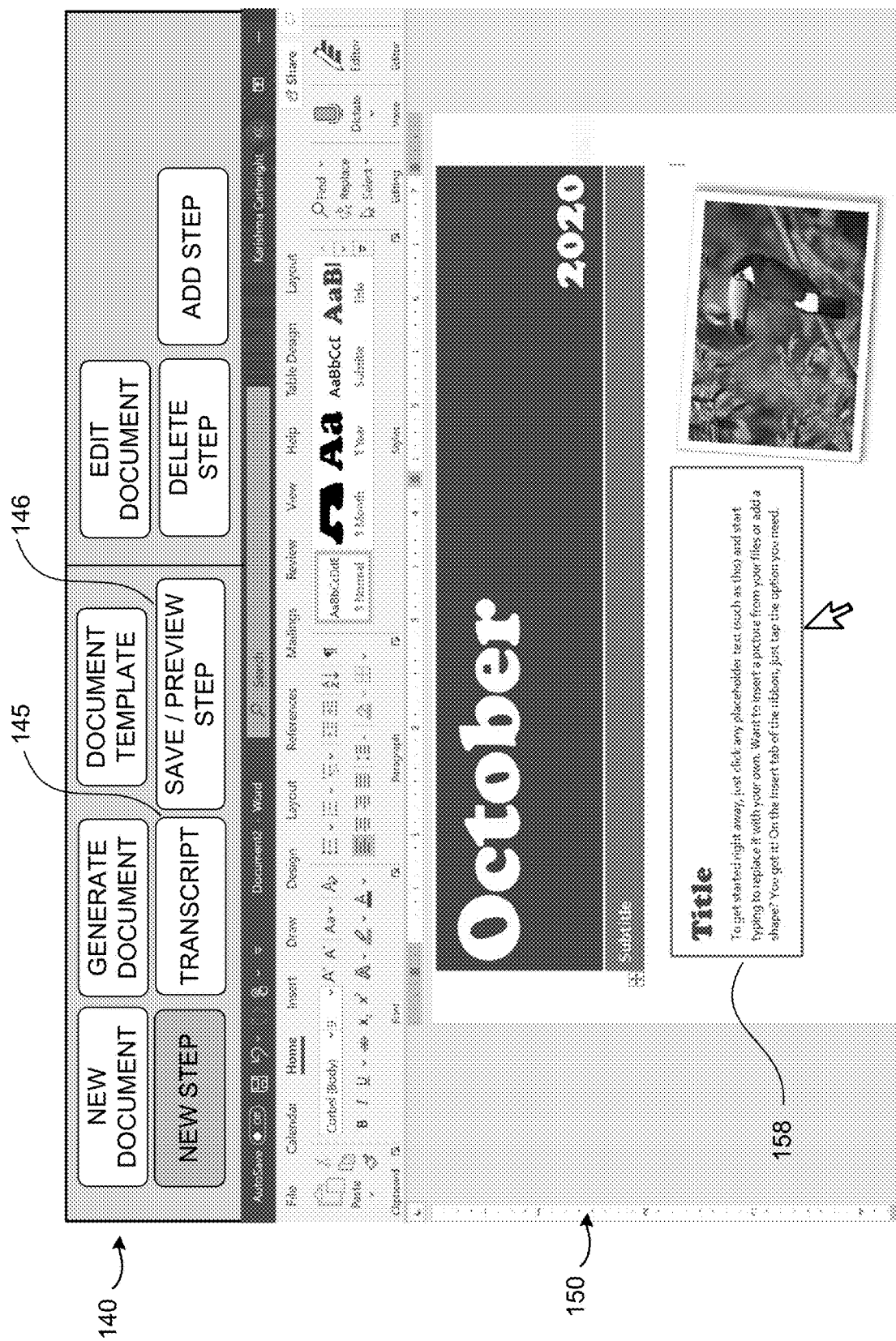

In some embodiments, the "new step" button 144 may remain selected, as shown by shading of button 144 in FIGS. 1C and 1D, to indicate to the user 104 that selections with respect to the application 150 are being recorded for the step 170 to be included in the document. After selecting the visual portion 172 for the step 170, the user 104 may select the markup portion 174 for the step 170. In some implementations, the user 104 may select the markup portion 174 before the visual portion 172. Referring to FIG. 1A, the system 110 may receive (at a step 124) selection of a markup portion 174 for the step 170, where the selection includes one or more interface elements of the application 150. The user 104 may select the interface element 158 of the application 150, as shown in FIG. 1D with a solid line rectangle. In some implementations, such selection may involve clicking on the displayed interface element 158. In other implementations, such selection may additionally or alternatively involve a click-and-drag operation, where the user 104 may click near the interface element 158, and while holding down the mouse button, may drag the cursor to another location near the interface element, to select everything from the beginning to the end of the drag, such that the interface element 158 is selected. The interface element 158 may be marked up, for example, with a red rectangle box, to indicate to the user 104 that the interface element 158 will be used as the markup portion 174 for the step 170. In some implementations, the user 104 may provide a voice input selecting the markup portion 174. For example, the user 104 may say "select Title for markup with red box."

In some embodiments, the user 104 may also provide input representing the transcript portion 176 for the step 170. In some implementations, the document generation toolbox 140 may, for example, include a button 145 labeled "transcript" as shown in FIG. 1D. The user 104 may click/select the button 145 and then provide the input representing the transcript portion 176, where the input may be a text input or a voice input. Referring to FIG. 1A, the system 110 may (at a step 126) receive the input for the transcript portion 176 for the step 170. In the case that the input is a voice input, the system 110 may perform speech recognition and/or natural language understanding techniques to determine, from the voice input, the transcript portion 176. In some implementations, the document generation toolbox 140 may generate the transcript portion 176 based on the visual portion 172 and the markup portion 174. For example, the transcript portion 176 may be generated as "Click on Title" or "Click on the text Title."

The user 104 may provide an input indicating that the user is done providing information for the step 170. In some implementations, for example, the document generation toolbox 140 may include a button 146 labeled "save/preview step" as shown in FIG. 1D. The user 104 may click/select the button 146 to save and/or preview the step 170 to be included in the document. In some embodiments, the step 170 shown in FIG. 1G may be displayed at the device 102 for the user 104 as a preview. The user 104 may click the button 146 again to save the step 170. In response to the user 104 indicating to save the step 170, the system 110 may store (at a step 128 of FIG. 1A) data for the step 170 based on the received inputs, where the data includes a sequence identifier. The system 110 may store a data record corresponding to the step 170, where the data record may be associated with or may include a sequence identifier that identifies the position of the step 170 relative to the other steps (e.g., step 180) to be included in the document. For example, referring to FIG. 1G, the step 170 may be associated with the sequence identifier "1", while the step 180 may be associated with the sequence identifier "2." The user 104 may provide the sequence identifier as an input for the step 170. In some implementations the system 110 may determine the sequence identifier based on the user 104 clicking the "new step" button 144. For example, if the user 104 clicked the button 144 for the first time for generating the instant document, then the system 110 may determine the sequence identifier for the step 170 to be "1", and when the user 104 clicks the button 144 the next time to provide information for the step 180, the system 110 may determine the sequence identifier to be "2" for the step 180.

At the step 128 of the FIG. 1A, the system 110 may store, in the data record, data corresponding to the visual portion 172 based on the selection received at step 122. This data may be an image representing the portions 153 and 154 of the application 150 (shown in FIG. 1C). In some implementations, where the application 150 is accessed via a web browser, this data may be one or more HTML elements retrieved from a document model object (DOM), where the HTML elements correspond to the portions 153 and 154 of the application 150. The DOM for the application 150 may represent one or more hypertext markup language (HTML) elements corresponding to the interface elements of the application 150, and may indicate a name and type of the interface elements. The DOM may also indicate an attribute (e.g., font style, color, size, etc.) associated with the interface elements, and the data record may include the attribute associated with the interface elements displayed in the portions 153, 154 of the application 150.

At the step 128, the system 110 may also store, in the data record, data corresponding to the markup portion 174 based on the selection received at step 124. This data may represent a markup element to be rendered on the image corresponding to the visual portion 172, such as a red box or another type of shape/color, surrounds the interface element 158 selected as the markup portion 174 for the step 170. This data, in some implementations, may be an HTML element corresponding to the interface element 158 indicating the interface element 158 to be marked up for the step 170, and may also include an HTML element representing a markup, such as a red box, associated with the HTML element. This data, in some implementations, may also include a position/location/coordinates for the markup element indicating a location of the markup element within the document or relative to other interface elements included in the step 170. At the step 128, the system 110 may also store, in the data record for the step 170, data corresponding to the transcript portion 176 based on the input received at step 126. In this manner, data for the step 170 may be stored by the system 110 when the user 104 clicks the "save/preview" button 146 of FIG. 1D.

In some implementations, when the user 104 clicks the "save/preview" button 146, the default interactions with the application 150 may be enabled, so that the user 104 may navigate to another part of the application 150 to provide information for other steps in the document. When the user 104 is ready to provide information for other steps, the user 104 may click the "new step" button 144, which may disable default interactions with the application 150.

Figure 1E:
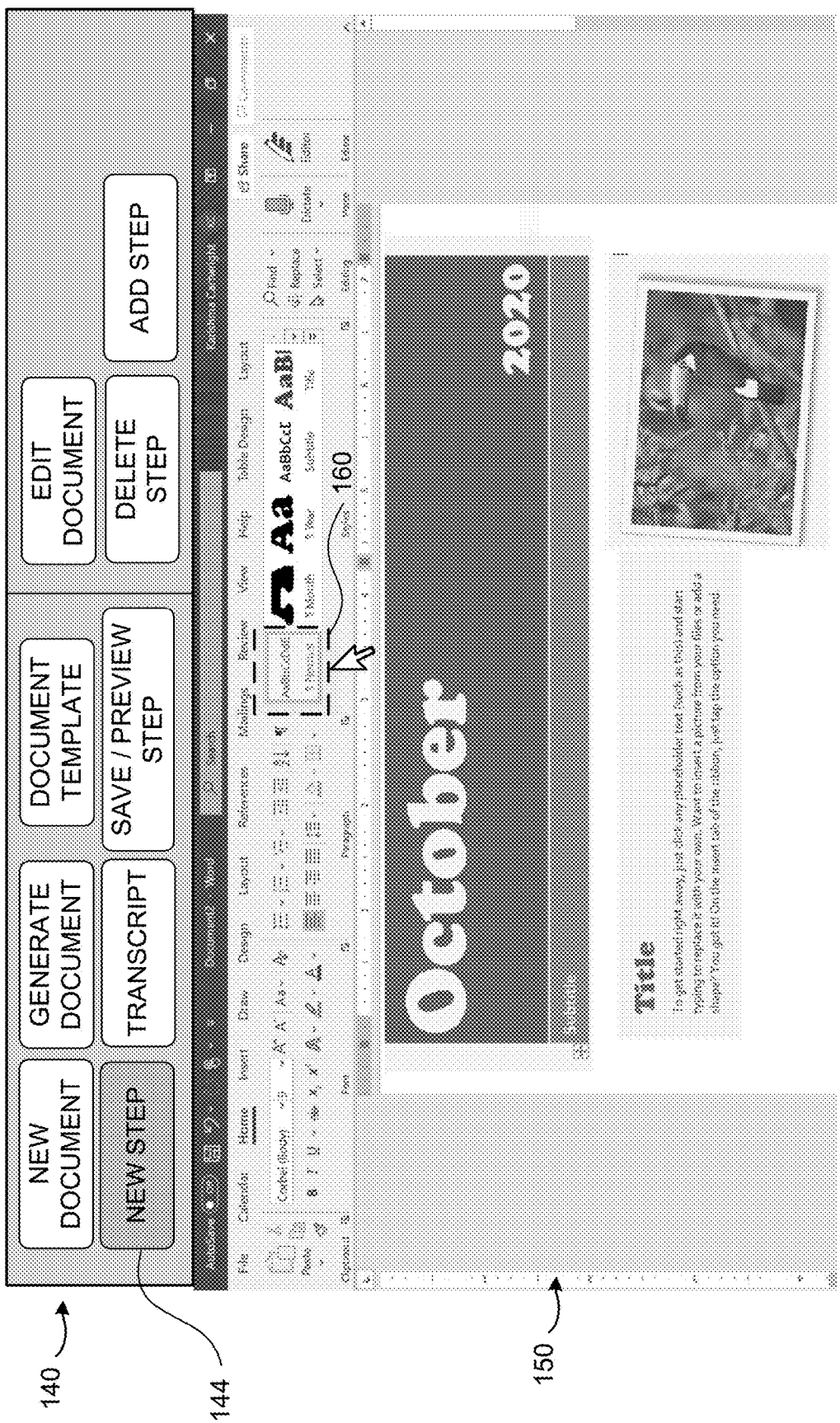

The user 104 may provide information for another step, for example the step 180, for the document using the document generation toolbox 140 in a similar manner as described above. For example, as shown in FIG. 1E, the user 104 may click/select the "new step" button 144 to indicate to the system 110 that the user 104 wants to provide information for another step. One or more portions of the application 150 may be highlighted on the display screen of the device 102 to indicate to the user 104 portions of the application 150 that are selectable for the step 180. The user 104 may first select the portion 160, as shown in FIG. 1E, as the visual portion 182 for the step 180. The user 104 may then select the interface element 162, shown in FIG. 1F, as the markup portion 184 for the step 180. After clicking the "transcript" button 145, the user 104 may provide an input (text or voice input) representing the transcript portion 186 for the step 180. The user 104 may then click on the "save/preview step" button 146 to save and/or preview the step 180.

In response to the user 104 clicking the "save/preview step" button 146, the system 110 may store a data record corresponding to the step 180, where the data record may be associated with or may include a sequence identifier identifying the positon of the step 180 relative to the step 170 in the document. The system 110 may also store, in the data record for the step 180, data corresponding to the visual portion 182 and data corresponding to the markup portion 184. In this example, the user 104 may select the same portion/interface element of the application 150 as both the visual portion 182 and the markup portion 184 for the step 180. In this case, the system 110 may derive the visual portion 182 based on the selection of the portion 160 of the application 150, where the visual portion 182 is determined to include one or more portions/interface elements proximate to the selected portion 160, as shown in FIG. 1G.

The data corresponding to the visual portion 182 may be an image representing the portion of the application 150 proximate to the portion 160. In other implementations, where the application 150 is accessed via a web browser, the data corresponding to the visual portion 182 may be one or more HTML elements corresponding to portion of the application 150 proximate to the portion 160. The data corresponding to the markup portion 184 may represent a markup element to be rendered on the image corresponding to the visual portion 182, such as a red box or another type of shape/color, surrounds the interface element 162 selected as the markup portion 184 for the step 180. The data corresponding to the markup portion 184, in some implementations, may be an HTML element corresponding to the interface element 162 indicating the interface element 162 to be marked up for the step 180, and may also include an HTML element representing a markup, such as a red box, associated with the HTML element. The data record for the step 180 may also include text data representing the transcript portion 186 for the step 180. In this manner, data for the step 180 may be stored by the system 110 when the user 104 clicks the "save/preview" button 146 of FIG. 1F.

In some implementations, the user 104 may provide an input representing a title for the document, and the system 110 may store a data record including text data representing the title. In some implementations, the user 104 may provide an input indicating that a table of contents is to be included in the document. In some implementations, the system 110 may automatically generate a table of contents based on the content of the document. In other implementations, the user 104 may provide the content to be included in the table of contents.

After the user 104 provides information for the steps to be included in the document, the user 104 may provide an input to generate the document using the data stored for the steps. The user 104 may click/select a button 147 labeled "generate document" shown in FIG. 1F. Referring back to FIG. 1A, the system 110 may receive (at a step 130) the input to generate the document. In response, the system 110 may generate (at a step 132) the document using the stored data (at the step 128) to generate a visual portion, a markup portion and a transcript portion for one or more steps. The system 110 may generate the visual portion 172, the markup portion 174 and the transcript portion 176 for the step 170. In the case the data record for the step 170 includes one or more HTML, elements, the system 110 may generate the visual portion 172 by generating an image using the HTML elements. In this case, the system 110 may generate the markup portion

174 by rendering the markup element around the interface element indicated for markup in the data record.

Figure 1F:
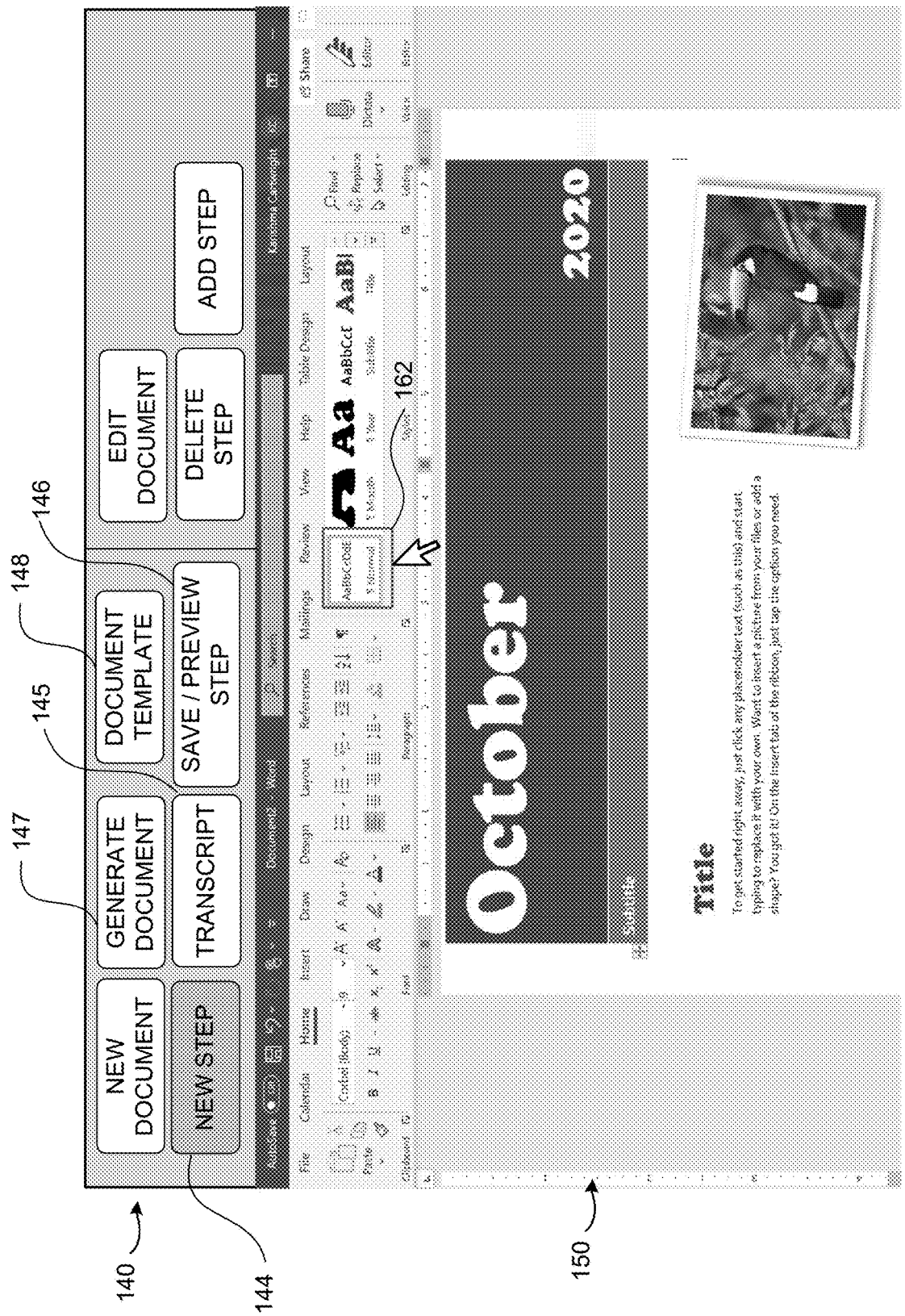

In some implementations, the user 104 may select a template, from a list of available templates, for the document, and may click a button 148, e.g., labeled "document template" shown in FIG. 1F, to select the template. If a document template is not selected by the user 104, then in some embodiments, the system 110 may use a default template. The system 110 may use the template to populate the document with the various steps (e.g., at least steps 170, 180) and to format the content of the document. In some implementations, one or more of the available templates may include a title placeholder indicating where a title may be located in the document and a format for the title. For example, in one template the title may be located in the center of the first page of the document, and may be in the font type "Times New Roman" and font size of 18 points. As another example, in another template the title may be located at the top of the first page of the document, and may be in the font type "Arial," font size of 16 points, and bold typeface. In some implementations, one or more of the available templates may include a table placeholder indicating where a table of contents may be located in the document and a format for the table of contents. The table contents may provide a summary of the content of the document, along with a page number indicating where certain content is located or can be found within the document. In some implementations, the template may also include a step placeholder indicating how (location and format) a visual portion and a markup portion is located with respect to a transcript portion, and how (location and format) the step identifier is located for a step. For example, one template may indicate that the step identifier is a cardinal number (e.g., 1, 2, 3, etc.), the transcript portion 176, 186 follows the step identifier, and the visual portion 172, 182 and markup portion 174, 184 are located below the step identifier and the transcript portion 176, 186, as shown in FIG. 1G. As another example, another template may indicate that the step identifier is a roman numeral (e.g., I, II, III, etc.), the visual portion 172, 182 and the markup portion 174, 184 follow the step identifier, and the transcript portion 176, 186 is located below the visual portion and the markup portion for the step 170, 180. One or more of the available templates, in some implementations, may also include how (location and format) a page number is included in the document, and how (location and format) a section (referring to a collection of steps or a subset of steps) is included in the document.

As used herein, a format included in the template for the foregoing placeholders may indicate a font type, a font size, a typeface, a line spacing, a paragraph spacing, a font color, an image boundary/outline, and/or other formatting with respect to text and image content of the document. As used herein, a location included in the template for the foregoing placeholders may indicate a page number, a vertical alignment, a horizontal alignment, and other information with respect to where text and image content is located in the document.

The system 110 may populate the document according to the selected template or a default template, and the user 104 may edit the location and format of the content of the document as desired.

The system 110 may create a word document or a pdf document. In some embodiments, the system 110 may create the document in another format. In generating the document, the system 110 may include at least the step 170 and the step 180, as shown in FIG. 1G. The system 110 may determine (at a step 134) a position of the step 170 relative to other the steps, for example the step 180, using the sequence identifier included in the data record for the step 170. For example, as shown in FIG. 1G, the system 110 may determine that the step 170 is to be included in the document prior to the step 180 based on the sequence identifier included in the data record for the step 170 and the sequence identifier included in the data record for the step 180.

In some implementations, the system 110 may enable a user 104 to provide the visual portion 172, 182, the markup portion 174, 184, and the transcript portion 176, 186 in a non-sequential manner. That is the order in which the user inputs are provided do not have to correspond to the order in which the steps are to be inserted in the document. Rather the user 104 can indicate which step the user inputs correspond to, and the system 110 may store the appropriate step identifier with the respective data record, so that the step data is inserted in the document as desired by the user 104. For example, the user 104 may provide user inputs and may indicate that they correspond to a second step in the document. The system 110 may store a step identifier "2" with the data record identified based on the user inputs.

In some implementations, the system 110 may also generate a DOM corresponding to the contents of the document generated at the step 132. The DOM may include a first (parent) node representing the first step 170 (and/or the associated first sequence identifier) in the document, a second (child) node (extending from the first node) representing the visual portion 172 for the first step 170, a third (child) node (extending from the first node or the second node) representing the markup portion 174 for the first step 170, and a fourth (child) node (extending from the first node, the second node or the third node) representing the transcript portion 176 for the first step 170. The DOM may further include another parent node, at the same level as the first node or extending from the first node, representing the second step 180 (and/or the associated second sequence identifier) in the document, a child node (extending from the parent node) representing the visual portion 182 for the second step 180, a child node representing the markup portion 184 for the second step 180, and a child node representing the transcript portion 186 for the second step 180.

The present disclosure may provide an improved user experience when creating a document by enabling a user to select information to be included in the document and the system automatically generating the document. A document generated using the system described herein may enable a user to edit the document without requiring the user to relaunch the application and perform the workflow again. The system described herein may use DOM and HTML elements to generate the steps 170 in the document.

In some implementations, the user 104 may provide inputs in the form of mouse clicks, keyboard inputs, gestures, touchscreen inputs, or the like. The user 104 may also provide voice inputs indicating selection of the visual portions 172, 182, and/or the markup portions 174, 184. The user 104 may also provide voice inputs indicating the transcript portion for the step. The user 104 may provide a combination of different inputs. For example, the user 104 may select an interface element using a mouse, while providing a voice input indicating a transcript portion 176 for a step 170.

In some embodiments, the document generation toolbox 140 may enable the user 104 to edit a stored document that may be previously generated as described above in connection with FIG. 1A. The document generation toolbox 140 may include various buttons, as shown in FIGS. 1B-1F, such as a "edit document" button, a "delete step" button and a "insert step" button, using which the user 104 may edit a document.

Figure 1H:
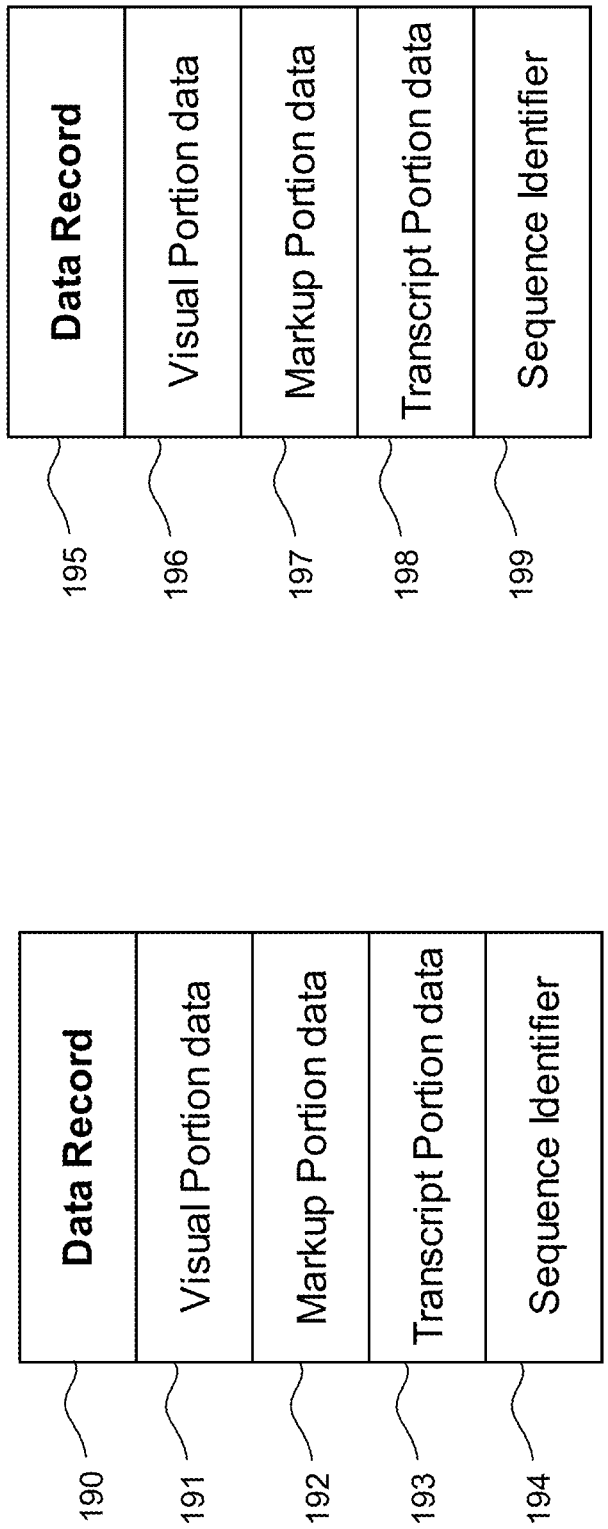
FIG. 1H shows example data records for steps of a document.

FIG. 1H shows example data records for the steps of a document. For example, a data record 190 may correspond to the step 170 and may include visual portion data 191 correspond to the visual portion 172, markup portion data 192 corresponding to the markup portion 174, and transcript portion data 193 corresponding to the transcript portion 176. The data record 190 may also include a sequence identifier 194 for the step 170. A data record 195 may correspond to the step 180 and may include visual portion data 196 correspond to the visual portion 182, markup portion data 197 corresponding to the markup portion 184, and transcript portion data 198 corresponding to the transcript portion 186. The data record 195 may also include a sequence identifier 199 for the step 180.

In the example implementation, where the document generation toolbox 140 may be used to generate a marketing/sales document, the step 170 may include purchase information for portions of the application 150, and the step 170 may include the visual portion 172 and the markup portion 174 illustrating features of the application 150 and the transcript portion 176 may include purchase information (e.g., a price to access the feature, information what the feature enables a user to do, etc.) for the features illustrated in the visual portion 172 and the markup portion 174. Similarly, the step 180 may include purchase information for other portions of the application 150.

In another example implementation, where the document generation toolbox 140 may be used to generate a document describing features of the application 150, the step 170 may include the transcript portion 176 describing features (e.g., how to use the features, how the features may be useful to a user, etc.) shown in the visual portion 172 and the markup portion 174. The step 180, similarly, may describe features of another portion of the application 150.

Additional details and example implementations of embodiments of the present disclosure are set forth below in Section E, following a description of example systems and network environments in which such embodiments may be deployed.

B. Network and Computing Environment

Figure 2A:
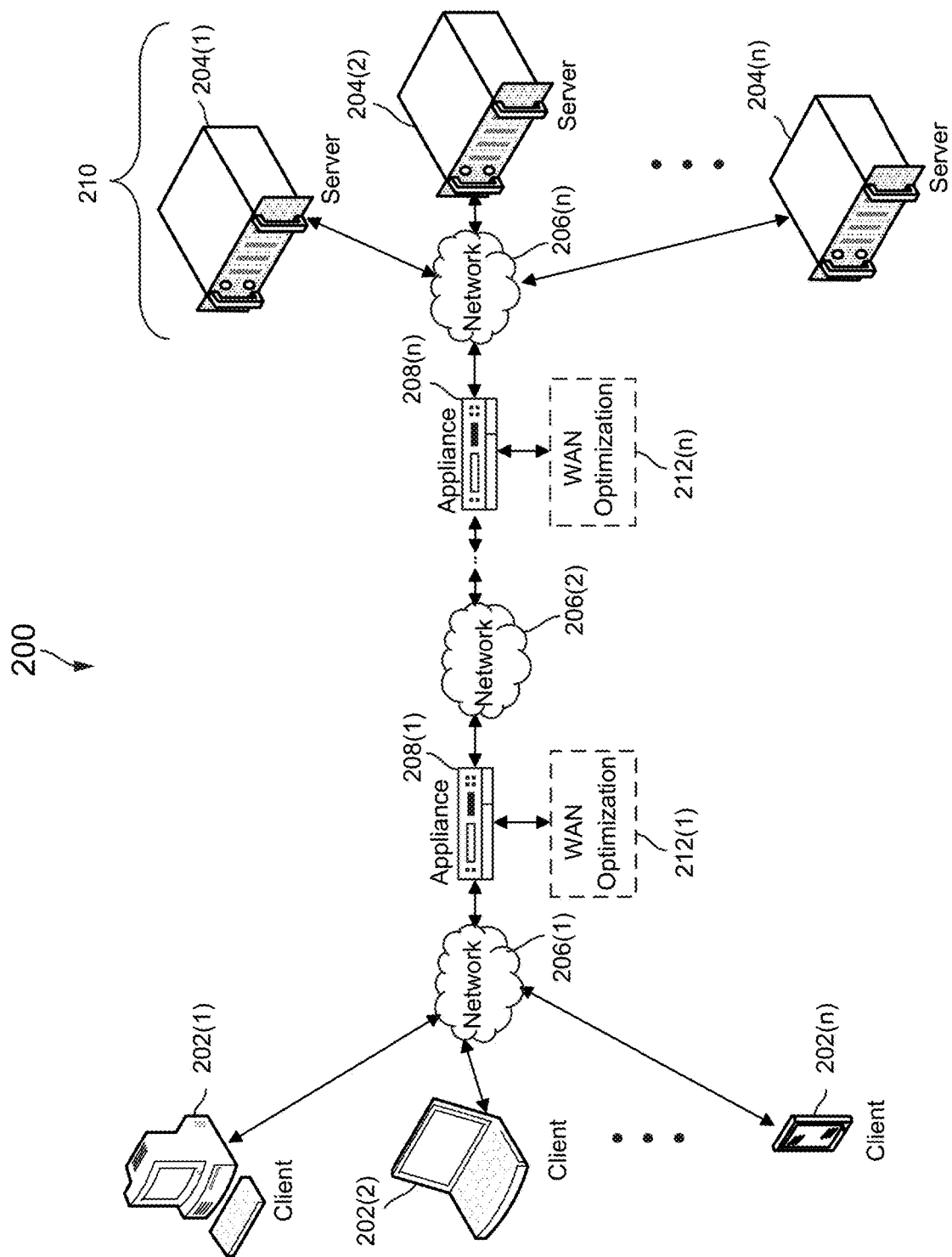
FIG. 2A is a diagram of a network computing environment in which some embodiments of the peripheral device sharing techniques disclosed herein may deployed.
Figure 3:
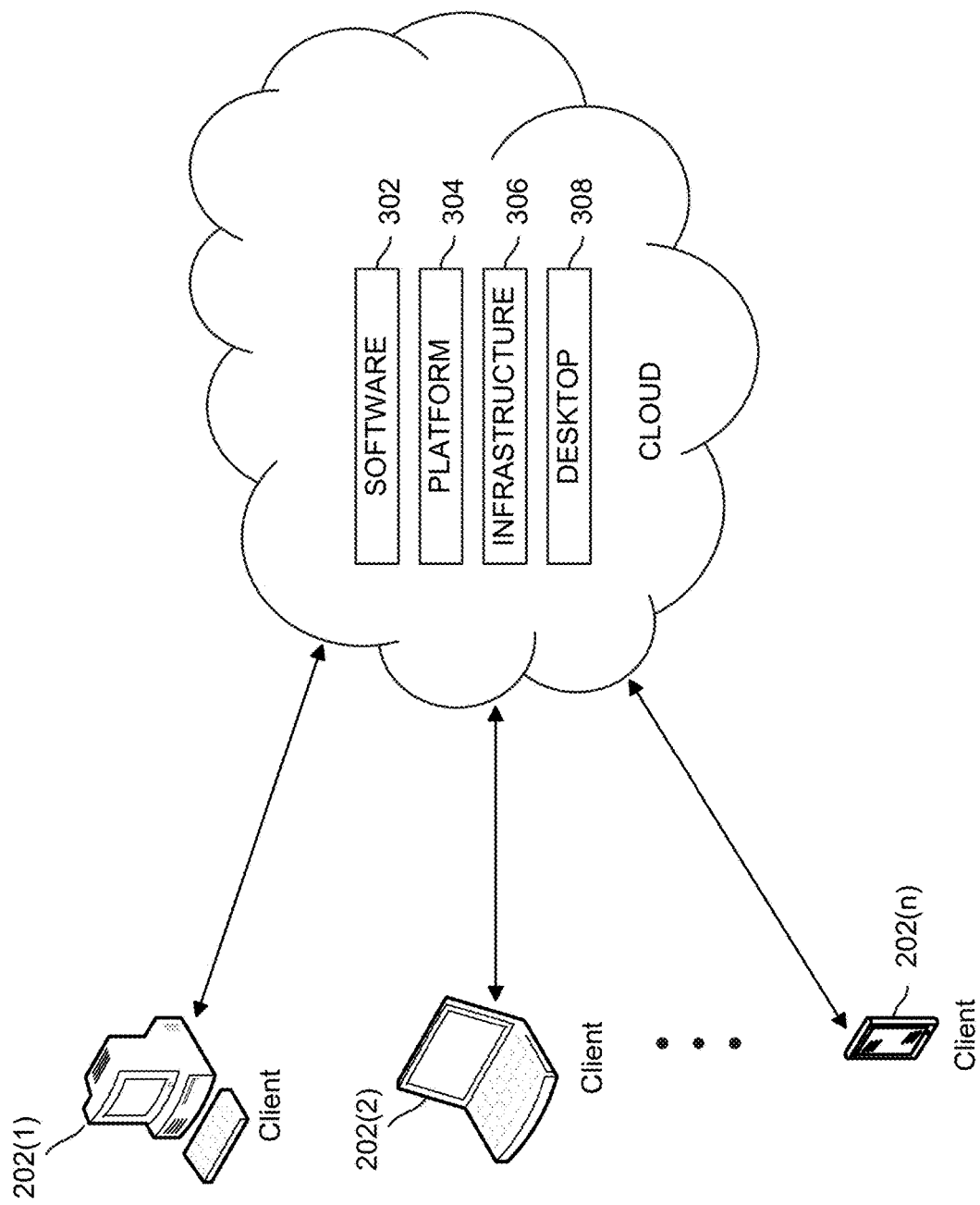
FIG. 3 is a schematic block diagram of a cloud computing environment in which various aspects of the disclosure may be implemented.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, FL, such as Citrix SD-WAN™ or Citrix Cloud™.

Figure 2B:
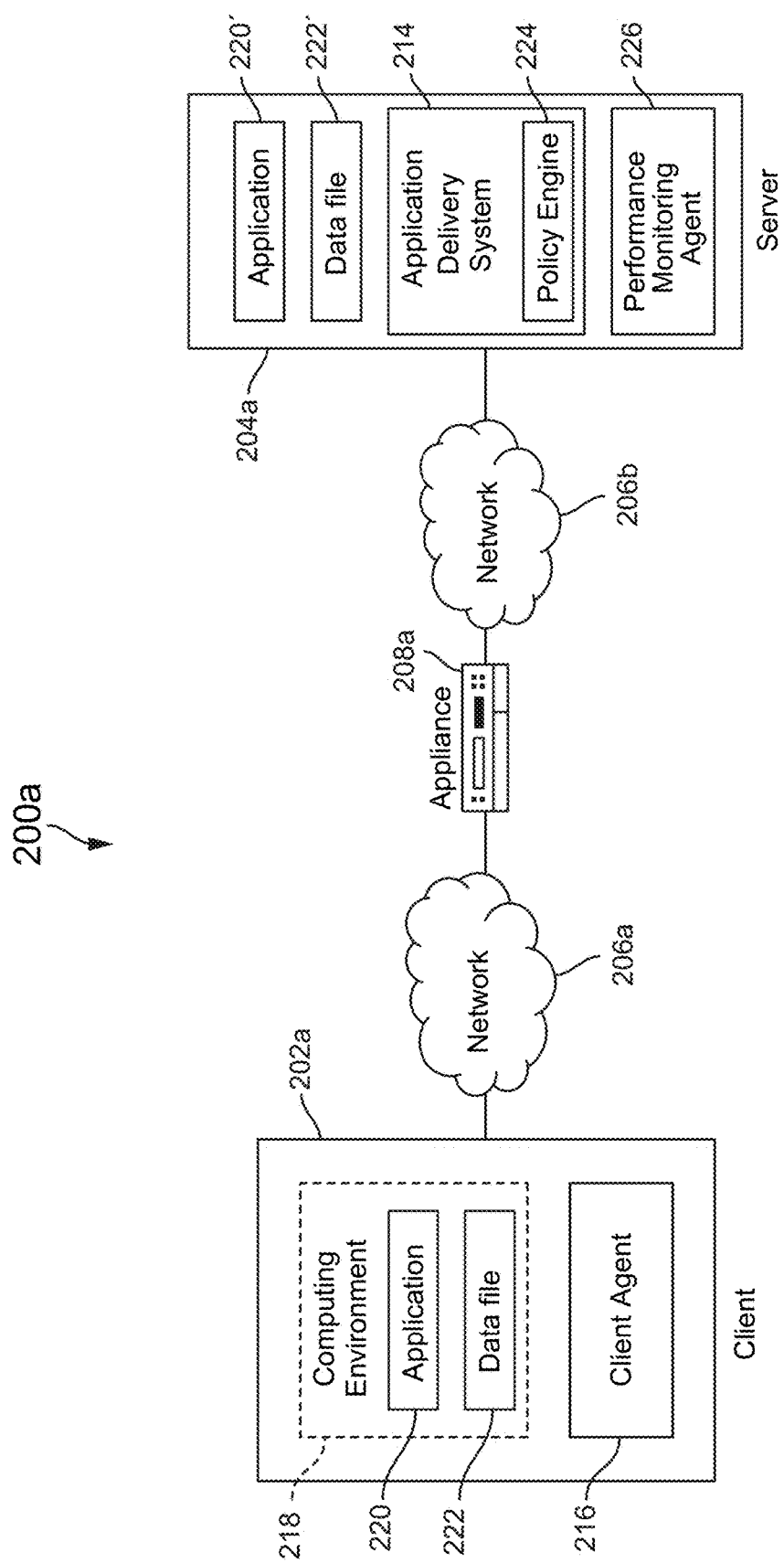
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 4A:
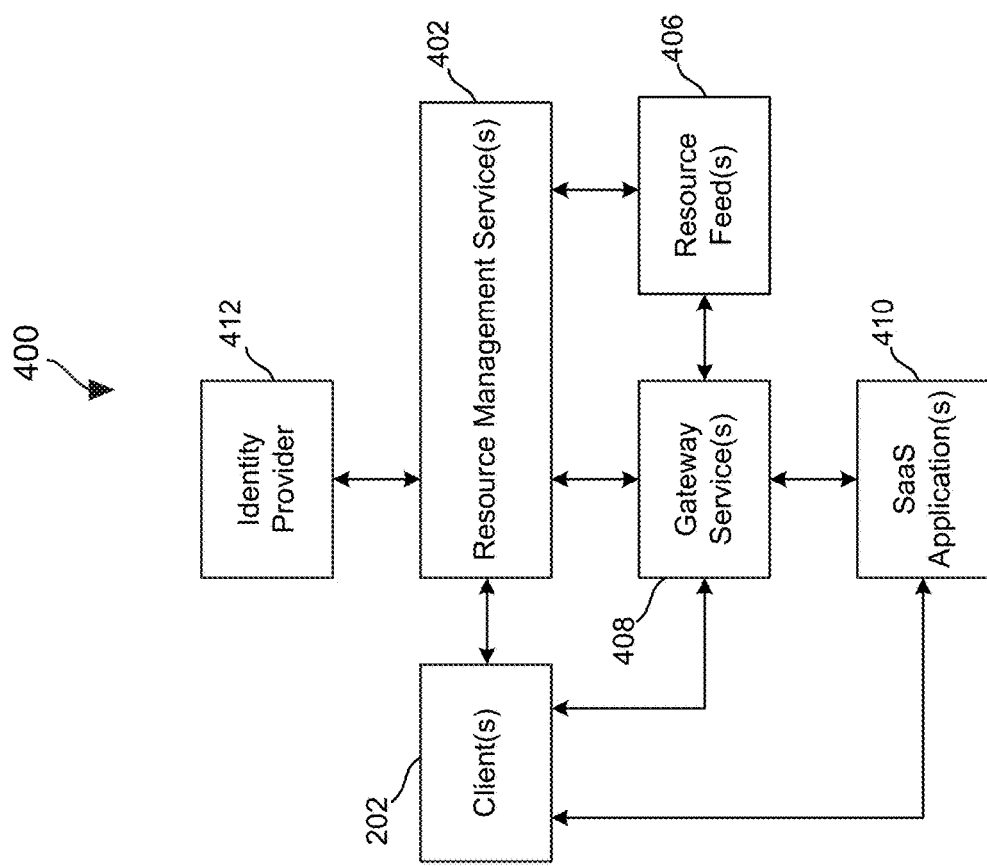
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 via one or more gateway services 408, and/or one or more software-as-a-service (SaaS) applications 410 (e.g., application 150 of FIG. 1B). In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
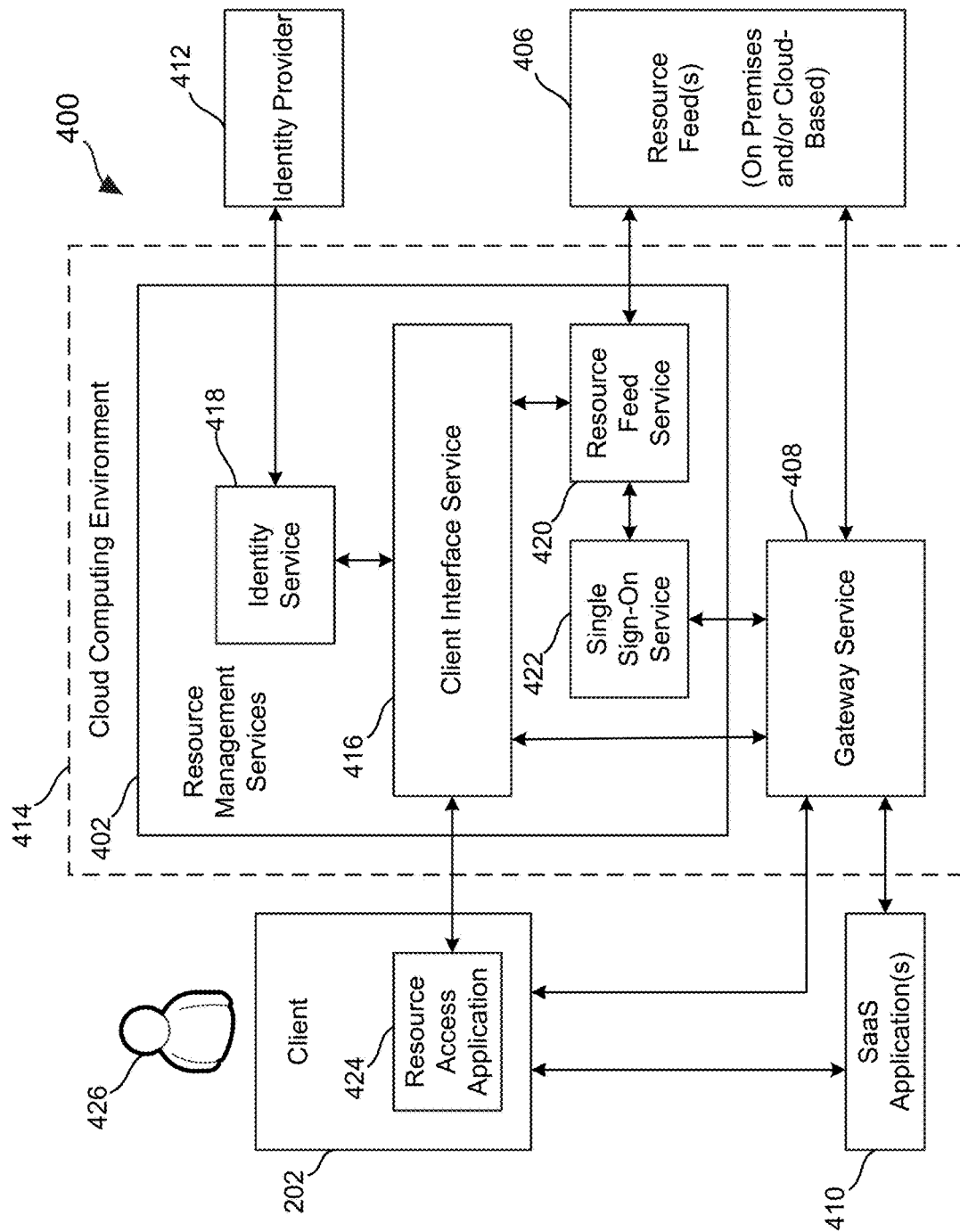
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of the illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 to request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource access application 424 is located remotely), e.g., via a secure browser service. The embedded browser may give users the best performance for rendering web pages of SaaS applications. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 5A:
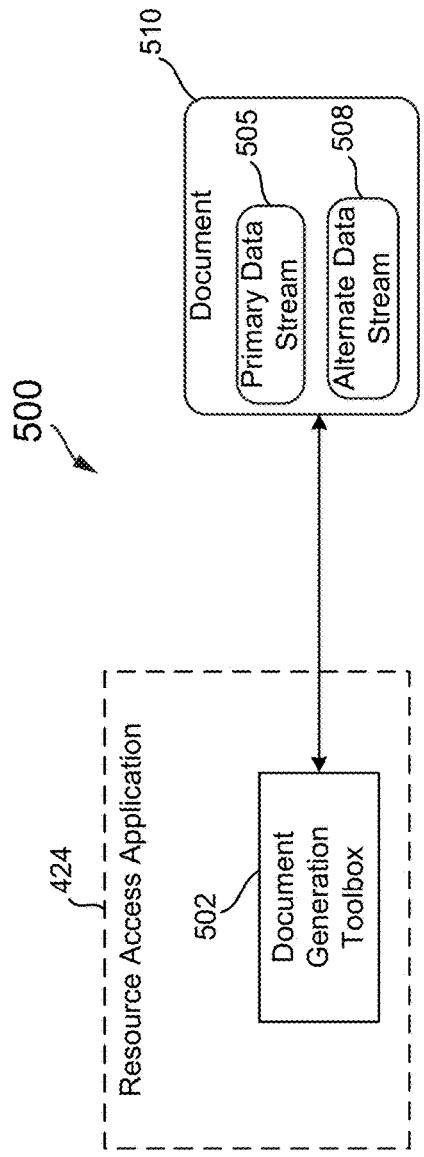
FIGS. 5A and 5B are block diagrams of example systems for generating a document using a document generation toolbox in accordance with some embodiments.
Figure 5B:
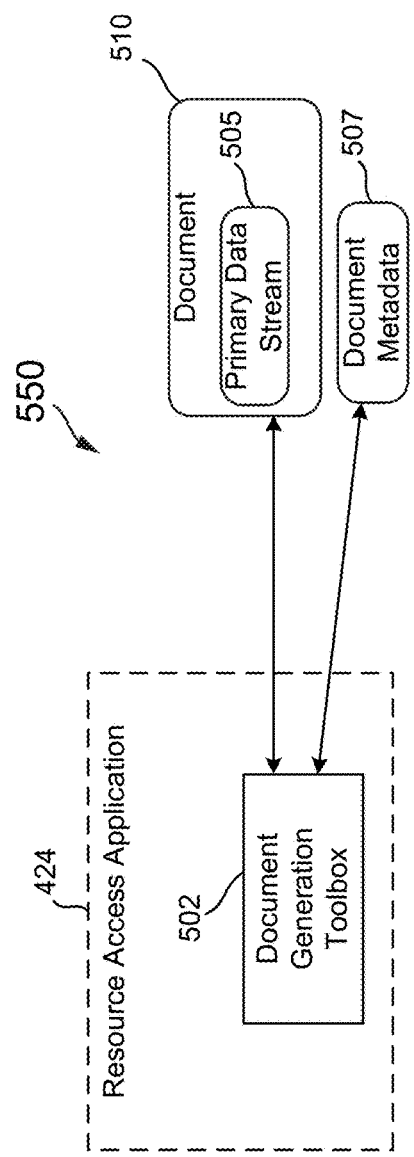

E. Detailed Description of Example Embodiments of Systems and Methods for Generating Documents FIGS. 5A and 5B are block diagrams of example systems 500, 550 for generating a document 510 based on user inputs received from the client device 202. As shown, the system 500, 550 may include a document generation toolbox 502. At a high level, the document generation toolbox 502 may, in some implementations, be responsible for determining at least visual portions 172, 182, markup portions 174, 184, and transcript portions 176, 186 (e.g., as shown in FIG. 1G) for the document 510 based on received user inputs. The document generation toolbox 502 may be responsible for generating the document 510 for an application 150, e.g., a software-as-a-service (SaaS) application 410 (shown in FIG. 4B), using the DOM, HTML elements and attributes corresponding to the application 150. The document 510 may include a primary data stream 505 including the contents (e.g., images of the visual portions 172, 182 with the marked up elements, text for the transcript portions 176, 186, sequence identifier, etc.) of the document. The primary data stream 505 may be the content of the document 510 that is viewable/displayable for the user 104. In some implementations, the primary data stream 505 may be image data representing the content of the document 510. In some implementations, as shown in FIG. 5A, the document generation toolbox 502 may also generate an alternate data stream 508 for the document 510. Generally, the alternate data stream 508 includes data for the document 510 that is other than/different than the contents of the document 510 included in the primary stream data 505. The alternate data stream 508 may include metadata for steps in the document 510, where the metadata may include the data records 190, 195 or may be derived from the data records 190, 195, along with metadata representing other information, such a title, a table of contents, a template, and/or other content of the document. In other implementations, as shown in FIG. 5B, the document generation toolbox 502 may generate document metadata 507 that may include metadata for steps in the document 510, where the metadata may include the data records 190, 195 or may be derived from the data records 190, 195, along with metadata representing other information, such as a title, a table of contents, a template, and/or other content of the document. In some implementations, the document metadata 507 and/or the alternate data stream 508 may be used to generate a DOM that may be an HTML-based representation of the structure and contents of the document 510.

Using the client 202, a user may enable the document generation toolbox 502 via an embedded browser, browser extension, browser plug-in, or other techniques. The generated document 510, as well as the alternate data stream 508 or the separate document metadata 507, may be stored at the client 202 (in a memory of the client 202 or other data storage associated with the client 202). Using the client 202, the user may load an existing/stored document to the document generation toolbox 502 for updating/editing. In some implementations, for example, a document 510 may be edited by accessing the alternate data stream 508 or the document metadata 507 for that document, e.g., by selecting an "edit document" user interface element (such as shown in FIG. 1B) and identifying the document 510 that is to be edited.

As illustrated in FIG. 5, in some embodiments, the document generation toolbox 502 may be included within the resource access application 424 (described above in connection with FIG. 4B), e.g., as a specialized browser embedded in that application. In other embodiments, the document generation toolbox 502 may be included within or operate in conjunction with another application executing on the client 202 or elsewhere, or perhaps may even be included as a component of an application for which a document is to be generated. In some embodiments, the application for which the document is to be generated may be a SaaS application.

Figure 6:
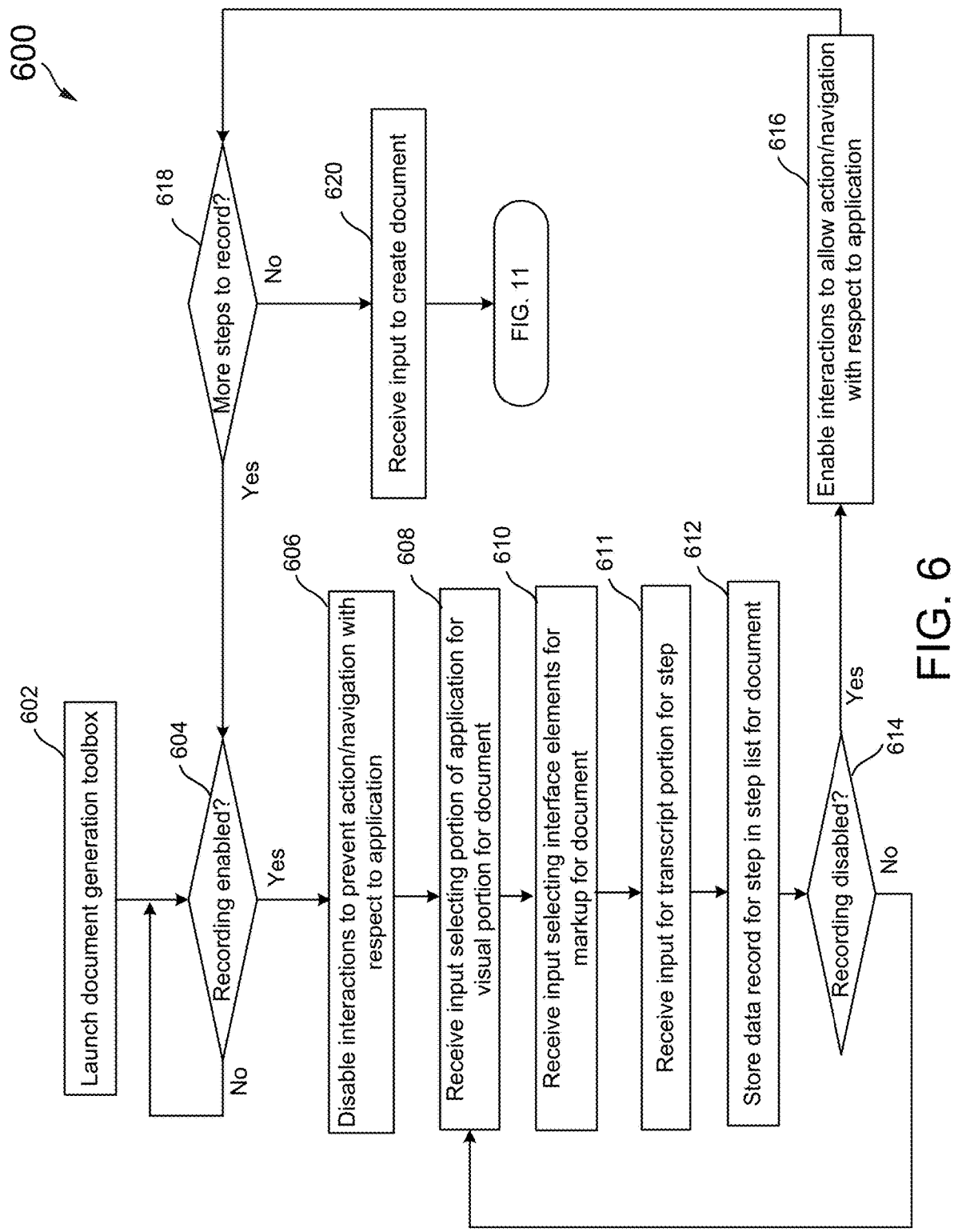
FIG. 6 is a flowchart showing an example routine that may be performed by the document generation toolbox shown in FIG. 5 in accordance with some embodiments.
Figure 7:
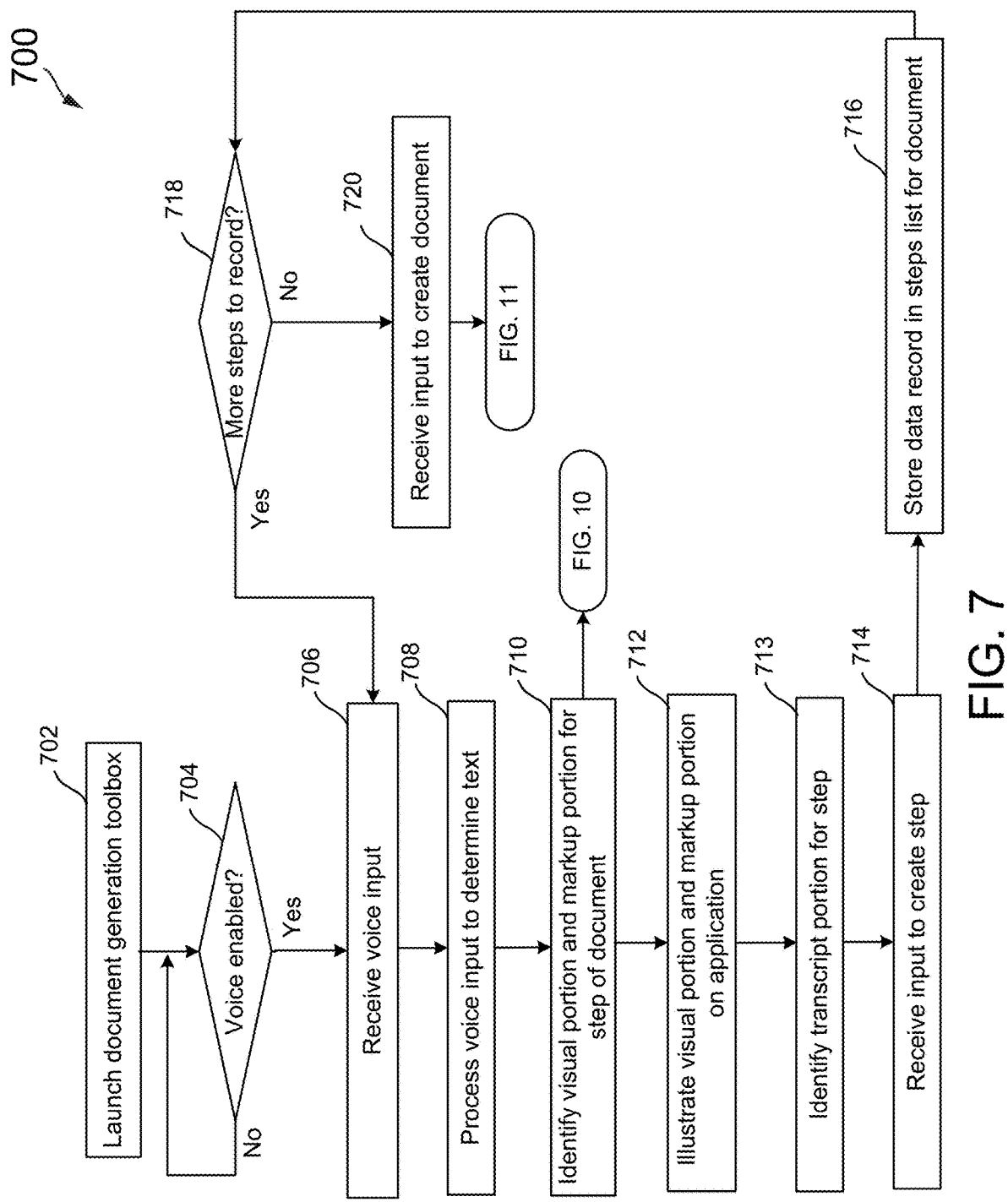
FIG. 7 is a flowchart showing an example routine that may be performed by the document generation toolbox shown in FIG. 5 in accordance with some embodiments.
Figure 8:
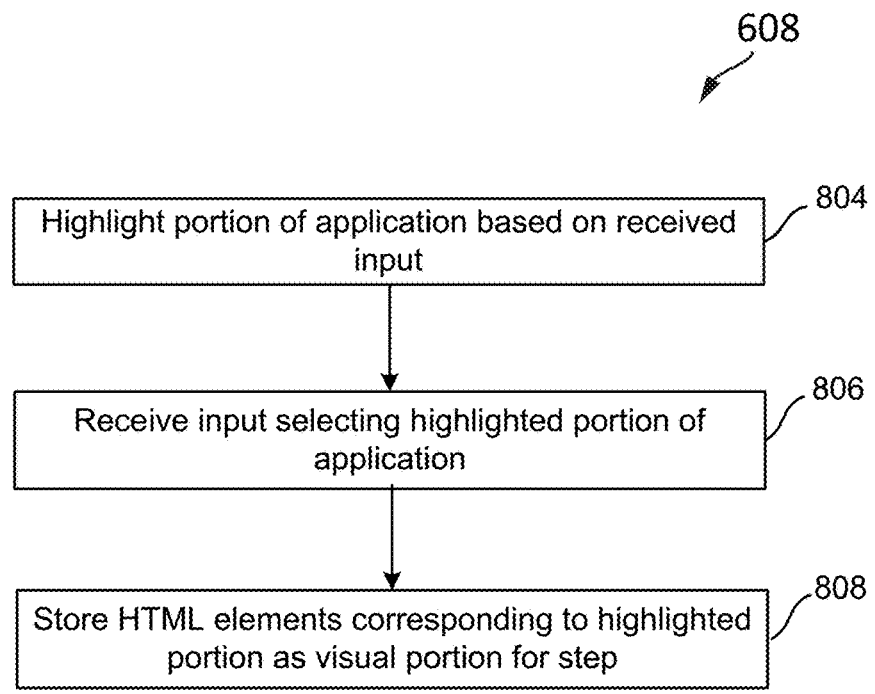
FIG. 8 is a flowchart showing an example routine that may be performed by the document generation toolbox shown in FIG. 5 in accordance with some embodiments.
Figure 9:
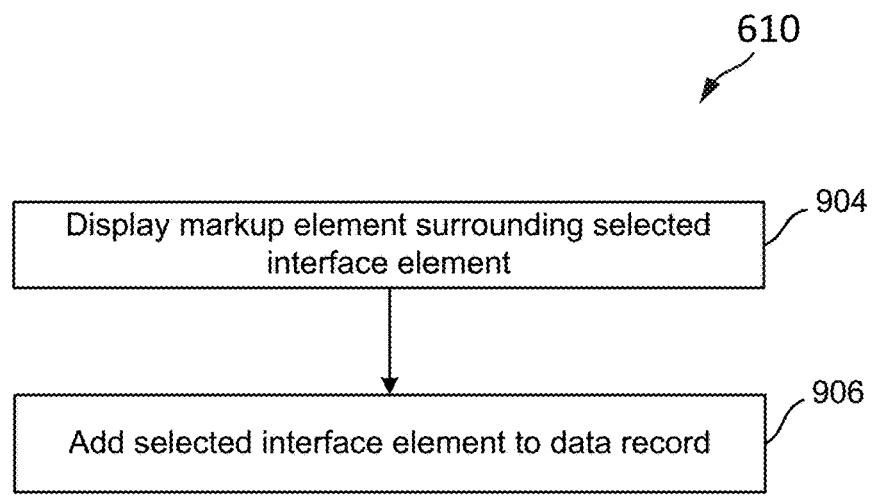
FIG. 9 is a flowchart showing an example routine that may be performed by the document generation toolbox shown in FIG. 5 in accordance with some embodiments.
Figure 10:
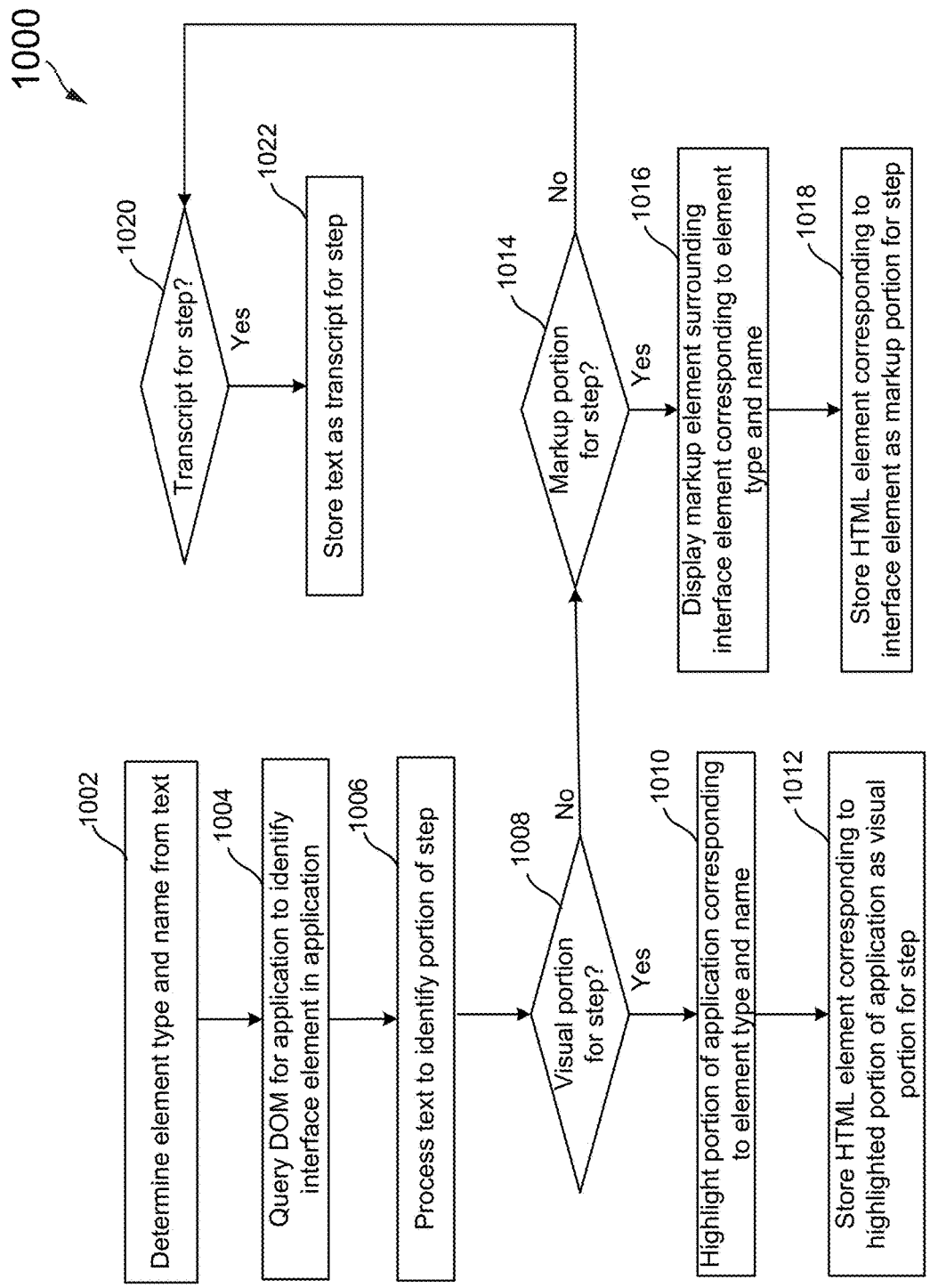
FIG. 10 is a flowchart showing an example routine that may be performed by the document generation toolbox shown in FIG. 5 in accordance with some embodiments.

FIG. 6 is a flowchart showing an example routine 600 that may be performed by the client 202 via the document generation toolbox 502 of the system 500 to receive inputs from the client 202 representing visual portions, markup portions and transcript portions to be included in the document. FIG. 7 is a flowchart showing an example routine 700 that may be performed by the client 202 via the document generation toolbox 502 to receive a voice input(s) from the client 202 corresponding to portions to be included in the user guide document. FIGS. 8 and 9 are flowcharts showing example routines that may be performed by the client 202 via the document generation toolbox 502 to determine visual portions, markup portions and transcript portions for a step in the document. FIG. 10 is a flowchart showing an example routine 1000 that may be performed by the client 202 via the document generation toolbox 502 to process the voice input to determine visual portions, markup portions and transcript portions for a step in the document.

Figure 11:
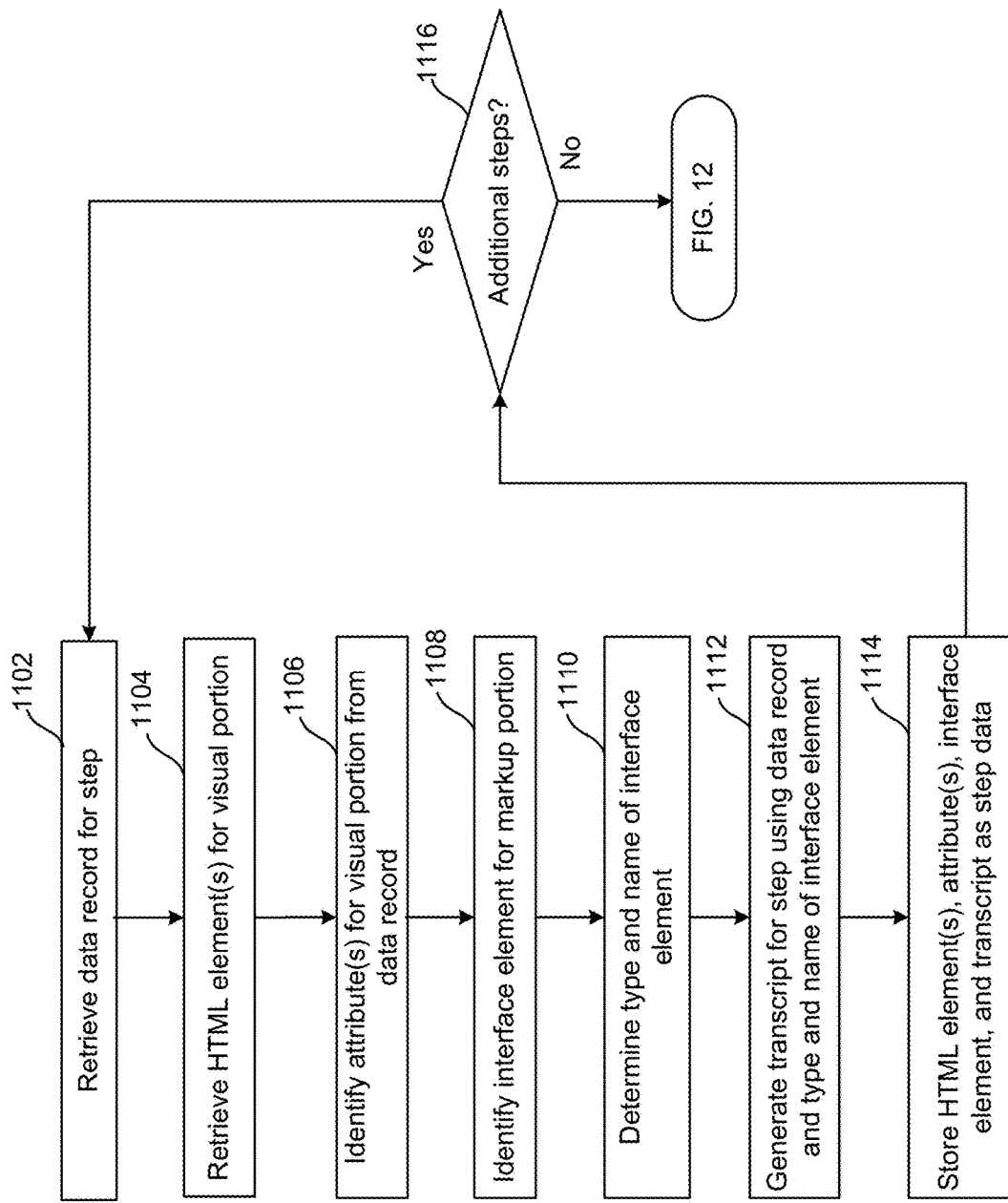
FIG. 11 is a flowchart showing an example routine that may be performed by the document generation toolbox shown in FIG. 5 in accordance with some embodiments.
Figure 12:
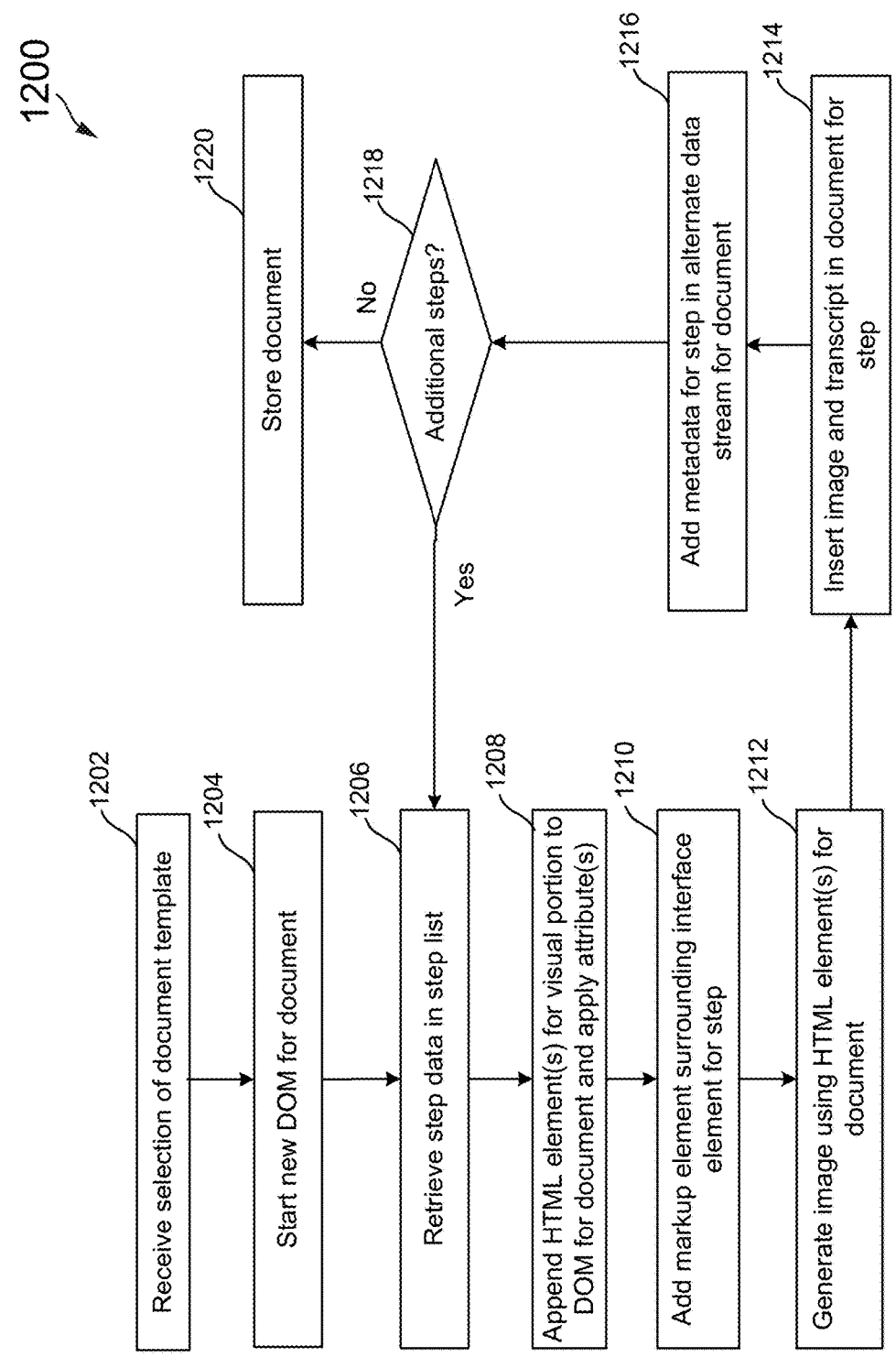
FIG. 12 is a flowchart showing an example routine that may be performed by the document generation toolbox shown in FIG. 5 in accordance with some embodiments.
Figure 13:
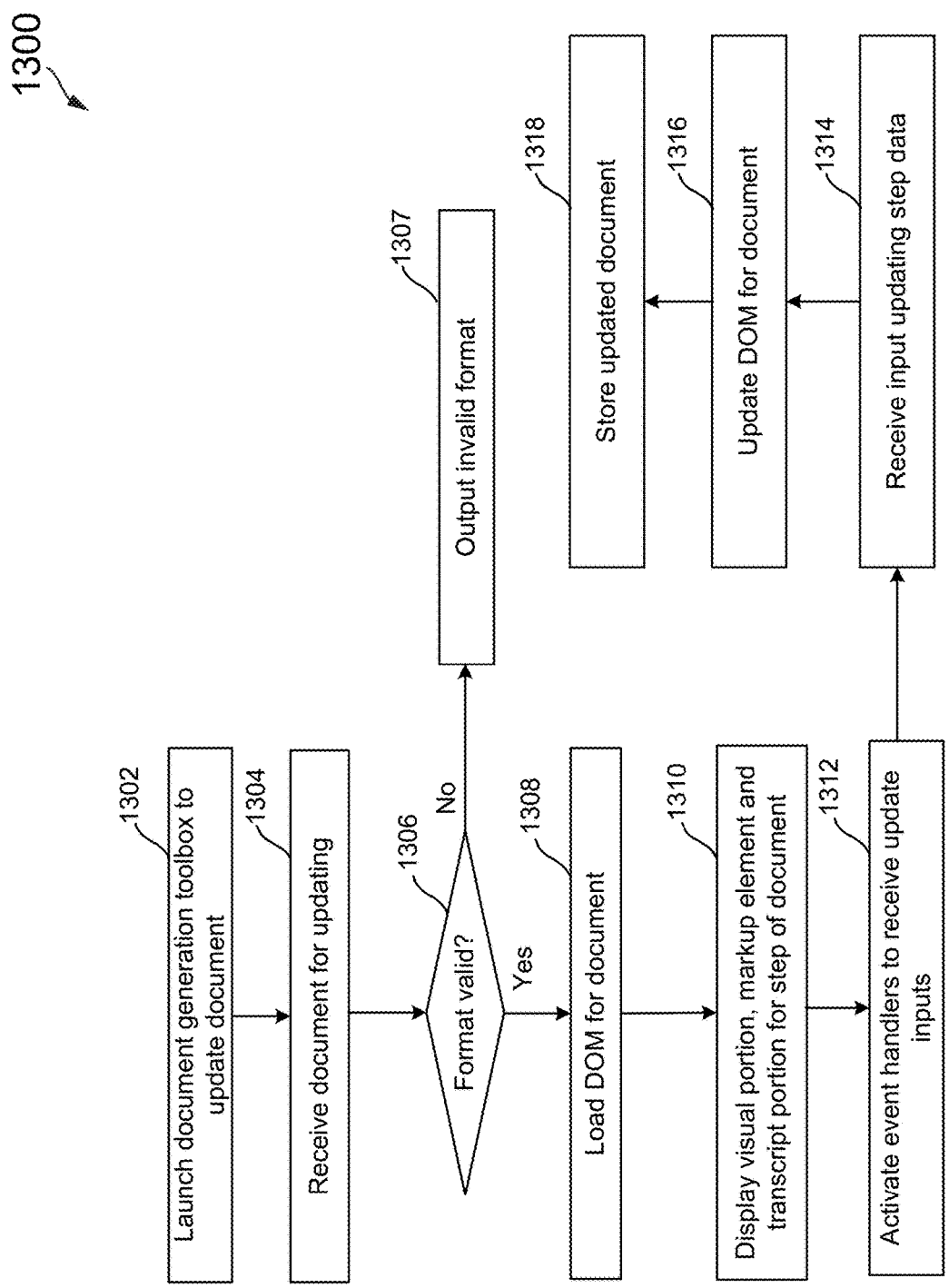
FIG. 13 is a flowchart showing an example routine that may be performed by the document generation toolbox shown in FIG. 5 in accordance with some embodiments.
Figure 14:
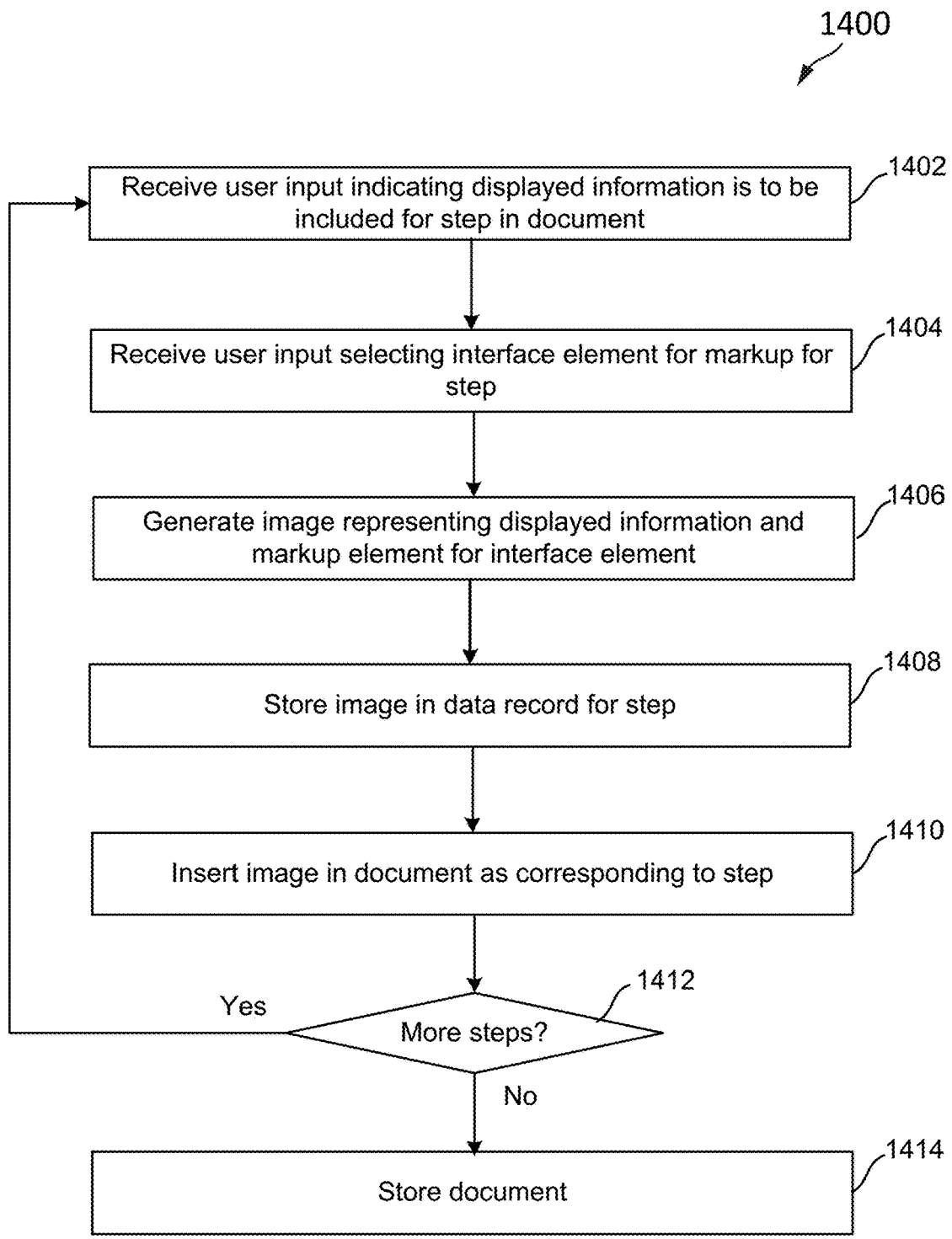
FIG. 14 is a flowchart showing an example routine that may be performed by the document generation toolbox shown in FIG. 5 in accordance with some embodiments.

FIG. 11 is a flowchart showing an example routine 1100 that may be performed by the client 202 via the document generation toolbox 502 to generate step data for a step in the document. FIG. 12 is a flowchart showing an example routine 1200 that may be performed by the client 202 via the document generation toolbox 502 to generate the user guide document using the step data generated using the routine 1100. FIG. 13 is a flowchart showing an example routine 1300 that may be performed by the client 202 via the document generation toolbox 502 to update a document. FIG. 14 is a flowchart showing an example routine 1400 that may be performed by the client 202 via the document generation toolbox 502 to generate a document using images of the application.

The various steps of the routines 600, 700, 1000, 1100, 1200, 1300 and 1400 described herein may be implemented, for example, by one or more processors that execute instructions encoded on one or more computer-readable media. Such processor(s) and computer readable medium(s) may, for example, be included in or operate in conjunction with the client 202 and/or the cloud computing environment 414 described above in connection with FIG. 4B. The operation of the routines 600, 700, 1100, 1200, 1300 and 1400 will now be described in more detail.

Referring first to FIG. 6, the client 202 launches (step 602) an instance of the document generation toolbox. The document generation toolbox 502 may be launched in response to a user clicking on or otherwise selecting a plug-in, browser extension or other form of an application corresponding to the document generation toolbox 502. In some implementations, for example, the user may launch the document generation toolbox 502 via a specialized embedded browser in the resource access application 424 of the client 202. The user may also use the specialized embedded browser (e.g., included in the resource access application 424 shown in FIG. 4A) to launch or navigate to an application for which the document is to be generated. Launching of the document generation toolbox 502 may cause the client 202 to load background and content scripts and various event handlers into the embedded browser.

The client 202, using the document generation toolbox 502, may determine (at a decision block 604) whether a recording function is enabled. In some implementations, selection of the "new document" button 142 or the "new step" button 144 (shown in FIGS. 1B and 1C) by the user 104 may enable the recording function. If the recording function is not enabled, then the client 202 may wait for the recording function to be enabled before proceeding to a step 606. If the recording function is enabled, the client 202 may disable interactions to prevent action or navigation with respect to the application in response to any mouse clicks, keyboard inputs or other forms of inputs received from the user. Disabling such interactions may allow the user to click on or otherwise select elements of the application (for purposes of generating the document) without causing the application to perform functionalities of the selected or clicked elements. For example, when interactions are disabled, clicking on a submit button for a form would not submit the form. However, as described below, clicking on or otherwise selecting a submit button may cause the submit button to be selected for use as a markup portion for a step in the document.

In some implementations, the interactions with the application 150 may be disabled as follows. The application 150 may be a SaaS application 410 accessed using the specialized browser embedded/provided in the resource access application 424, and the application 150 may be rendered as web pages at the specialized browser. The user 104 may access the document generation toolbox 502 using the specialized browser. When the recording function is enabled, via the document generation toolbox 502, the specialized browser may disable default interactions with web pages for the application 150, and instead enable the user 104 to select interface elements/portions of the web pages for the application 150. The client 202 may change a mode/setting of the specialized browser so that inputs received at the web page are treated as selection of an interface element/portions of the application 150, rather than interactions with the application 150.

At a step 608, the client 202 may receive an input selecting a portion of the application as the visual portion for a step for the document. As described above in relation to FIG. 1C, the visual portion of the document may represent a portion of the application that the step in the document is referring to. The received input may, for example, be a mouse input, an input via a touchscreen, etc., selecting a portion of the application. In some embodiments, the client 202 may enable selection of portions of the application based on the DOM structure corresponding to the application. The user may, for example, hover the mouse cursor over a portion of the application causing various DOM elements at or otherwise adjacent to a location of the cursor to become highlighted.

Referring to FIG. 8, as part of the step 608 (shown in FIG. 6), the client 202 may highlight (step 804) the portion of the application based on the received input. The client 202 may receive an input (step 806) selecting the highlighted portion of the application as the visual portion for the step, and at a step 808, the client 202 may store the HTML elements (derived from a DOM corresponding to the application 150) corresponding to the highlighted portion of the application as the visual portion for the step. The HTML elements may be stored as data in a data record for the step, which may be later used to generate the document, as described below in relation to FIG. 11. In some embodiments, the client 202 may receive an input deselecting the highlighted portion of the application, and indicating that the highlighted portion is to not be used as the visual portion for the step.

Referring again to FIG. 6, at a step 610, the client 202 may receive an input selecting one or more interface elements for the markup portion 174 for the step. As described above in relation to FIG. 1C, the markup portion 174 of the document may represent an interface element (e.g., a button, a website link, a tab, a text field, etc.) that the step in the document is referring to. The received input may be, for example, be a mouse input, an input via a touchscreen, etc., selection of the interface element within the portion of the application to be used as the markup portion 174. In some implementations, the received input may be selection of an interface element within the visual portion 172 (determined at the step 608).

Referring to FIG. 9, as part of the step 610 (shown in FIG. 6), the client 202 may display (at step 904) a markup element surrounding the selected interface element. The markup element, in some embodiments, may be a graphical element such as a rectangle (an oval or other shape) of a particular color, pattern, or marking drawn around the selected interface element (as shown in FIG. 1C). In other embodiments, highlighting or shading may be applied to the selected interface element in a color other than the one used by the application. The markup element may, for example, be rendered based on coordinates of the HTML element corresponding to the selected interface element. The client 202 may add (at a step 906) the selected interface element to the data record for the step. In some embodiments, an input deselecting the interface element may be received, in which case, the interface element may not be added to (or may be removed from) the data record. In some embodiments, there may be multiple markup portions for a step and data representing the multiple markup portions may be included in the data record.

In some embodiments, the step 610 may be performed before step 608, where the client 202 may receive an input selecting an interface element of the application for the markup portion of the step prior to receiving an input selecting the portion of application for the visual portion of the step. In some embodiments, the client 202 may highlight the portion of the application (in the step 804) based on the DOM structure corresponding to the selected interface element. For example, the client 202 may retrieve the HTML element corresponding to the selected interface element, may determine the parent nodes and sibling nodes for the HTML element in the DOM, and may highlight the portions of the application corresponding to the parent nodes and the sibling nodes, thus, highlighting a portion of the application 150 around the selected interface element.

Referring to FIG. 6, at a step 611, the client 202 may receive an input for the transcript portion 176 for the step. The received input may be a text input or a voice input including the information to be included in the transcript portion 176. For example, the received input may be "select title label." In the case the received input is a voice input, the client 202 may perform speech recognition and/or natural language understanding to determine the transcript portion 176 from the voice input. In some embodiments, the client 202 may determine the transcript portion 176 based on the visual portion 172 (determined at the step 608) and/or the markup portion 174 (determined at the step 610). In this case, the client 202 may display the determined transcript portion 176, and the user 104 may provide an input confirming or editing the transcript portion 176.

Referring to FIG. 6, at a step 612, the client 202 may store a data record for the step in a step list for the document. The data record may include the HTML element(s) or a parent node in the DOM structure corresponding to the portion(s) of the application 150 for the visual portion of the step and the selected interface element for the markup portion. The selected interface element may be represented by its corresponding HTML element in the step data. The data record may correspond to a step (e.g., a first step) in the document. The data record may, for example, be stored in response to the user providing a "create step" input (e.g., by clicking/selecting a button, etc.).

At a step 614, the client 202 may determine if the recording function is disabled. The user may, for example, disable (stop) the recording function to navigate to another portion of the application for the next step in the document. If the recording function is not disabled, then the client 202 may return to the step 608, where an input may be received (at the step 608) selecting a portion of the application as another visual portion for the step. From there, the client 202 may receive (at the step 610) an input selecting an interface element as another markup portion for the step, and, at the step 612, the HTML element(s) corresponding to the visual portion, the selected interface element, and the markup element may be stored as additional step data for the same step in the step list.

If the recording function is disabled, then (at a step 616) the client 202 may enable interactions with the application to allow actions and navigation with respect to the application, thus allowing the user to navigate to another portion of the application. For example, when interactions are enabled, clicking or selecting of a tab in a form may cause the clicked/selected tab to display. In some implementations, the application 150 may be a SaaS application 410 that is rendered as web pages using the specialized browser embedded in the resource access application 424, and in enabling interactions with the application, the client 202 may set the specialized browser so that inputs received at the web pages are treated as interactions with the application 150.

At a step 618, the client 202 may determine if there are more steps for the document to be recorded. The user may, for example, provide an input indicating that there are more steps to be recorded, in which case the client 202 may return to the decision block 604 (where the client 202 may wait for the recording function to be enabled once again). Once the recording function is enabled, during another iteration of the routine 600, the client 202 may receive inputs and store a data record for the next step (e.g., a second step) in a steps list for the document. In some implementations, the client 202 may keep track of the information/data for each step using a steps list (e.g., a data table), where the information/data may be associated, for example, with a step identifier/number. The data record for each step may be associated with the step identifier/number and may be stored in the steps list.

The user may provide an input indicating that there are no more steps to be recorded for the document, in which case, the client 202, at a step 620, may receive an input to create the document. The client 202 may, for example, create the document according to the routine 1100 described below in connection with FIG. 11.

The client 202 may, when launched, load various event handlers to receive the various inputs described above. Example event handlers may include browser introspection handlers, event observing handlers, webNavigation handler, mutationObserver handlers, click event handlers, event listeners, and others. To disable interactions with the application, the client 202 may, for example, employ a method called "preventDefault( )" or "stopPropagation( )", which may be configured to cancel a detected event (if cancellable) so that the default action corresponding to the event does not occur.

In some implementations, the client 202 may additionally or alternatively receive voice inputs indicating the visual portions, the markup portions and the transcript portions to be included in the step for the document, and may process the voice input as described in relation to FIG. 7.

Referring to FIG. 7, the client 202 may cause the client 202 to launch an instance of the document generation toolbox, in a similar manner as described above in relation to step 602 of FIG. 6. The client 202, at decision block 704, may determine if the voice function is enabled. If the voice function is not enabled, then the client 202 may wait for the voice function to be enabled before proceeding to step 706.

If the voice function is enabled, the client 202 may receive (at step 706) a voice input, provided by the user, via a microphone of the client 202. The client 202 may process the voice input to determine text representing what the user said. The client 202 may use automatic speech recognition techniques to convert the voice input to text data (at step 708). The client 202 may identify (at step 710) a visual portion and a markup portion for a step (e.g., a first step) in the document using the voice input. The client 202 may perform the routine 1000 of FIG. 10 as part of step 710.

The voice input may include instructions on which interface element to select for markup and which portion of the application to use for the visual portion for the step. Referring to a step 1002 of FIG. 10, the client 202 may determine an element type and name from the text corresponding to the voice input. At a step 1004, the client 202 may query the DOM corresponding to the application to identify a HTML element corresponding to the element type and name indicated in the voice input. For example, for the voice input "select the submit button," the client 202 may determine the element type is "button" and the name is "submit." In another example, for the voice input "select the miscellaneous tab," the client 202 may determine the element type is "tab" and the name is "miscellaneous." Using the element type and name, the client 202 may identify the interface element in the DOM that the user is referring to.

The client 202 may process the text to identify (at step 1006) which portion of the step the voice input relates to. The client 202 may use natural language understanding techniques to process the text. As described above in relation to FIG. 1C, a step may include a visual portion, a markup portion and a transcript portion. The client 202 may determine (at decision block 1008) if the voice input relates to the visual portion of the step. In some cases, the voice input may be "select the visual portion for the step containing <interface element name and type>." In other cases, the voice input may be "select the visual portion" or "use the visual portion", and the voice input may be received while a portion of the application for the visual portion is highlighted by the client 202. Based on the voice input mentioning the words "visual portion", the client 202502 may determine that the voice input relates to the visual portion.

If the voice input relates to the visual portion, then the client 202 may highlight (at step 1010) the portion of the application corresponding to the element type and name, to show the user which portion of the application will be used as the visual portion for the step. At step 1012, the client 202 may store the HTML element(s) corresponding to the highlighted portion of the application as the visual portion for the step. The HTML element(s) may be stored associated with the step, that may be later used to generate the document, as described below in relation to FIG. 11. In some embodiments, the client 202 may receive a voice input (for example after step 1010) deselecting the highlighted portion of the application, indicating that the highlighted portion is not to be used as the visual portion for the step.

If the voice input does not relate to the visual portion of the step, then the client 202 may determine if (at decision block 1014) the voice input relates to the markup portion of the step. In some cases, the voice input may be "select markup containing <interface element name and type>" or "draw a markup around <interface element name and type.>" In other cases, the voice input may be "select the markup portion," where the voice input is received while the client 202 is showing a markup element surrounding an interface element. In yet other cases, the voice input may be "select markup using current mouse position" (in which case the client 202 may select, for markup, the interface element where the mouse cursor is hovering). Based on the voice input indicating selection of a markup portion, the client 202 may determine that the voice input relates to the markup portion of the step.

If the voice input relates to the markup portion of the step, then the client 202 may display (at step 1016) a markup element surrounding the interface element corresponding to the element type and name indicated in the voice input. The markup element, in some embodiments, may be a graphical element such as a rectangle (an oval or other shape) of a particular color drawn around the selected interface element (as shown in FIG. 1C). In other embodiments, the markup may be highlighting or shading the interface element in a color other than the one used by the application. The client 202 may store (at a step 1018) the HTML, element, in the step data for the step, corresponding to the interface element as the markup portion for the step. The client 202 may also store the markup element in the step data. In some embodiments, the client 202 may receive a voice input (for example after step 1016) deselecting the interface element with the markup element, indicating that the interface element is not to be used as the markup portion for the step.

If the voice input does not relate to the markup portion (at decision block 1014), then the client 202 may determine (at decision block 1020) if the voice input relates to the transcript portion of the step. In some cases, the voice input may be "the step details are_____" or "the step transcript is_____." Based on the voice input including the words "transcript portion", the client 202 may determine that the voice input relates to the transcript portion of the step. If the voice input relates to the transcript portion, then the client 202 may store the text (at a step 1022), in the step data, as the transcript portion for the step.

Referring to FIG. 7 again, the client 202 may illustrate (at a step 712) the visual portion and the markup portion (as identified in step 710) to indicate to the user which portions of the applications will be used as the visual portion and the markup portion. For example, the client 202 may highlight the portion of the application to be used as the visual portion and display the markup element for the interface element to be used for the markup portion for the step. At step 713, the client 202 may identify the transcript portion for the step from the text corresponding to the voice input. The client 202 may perform speech recognition and/or natural language understanding to identify the transcript portion from the voice input. In some implementations, the client 202 may determine the transcript portion for the step based on a name and/or a type of the interface elements selected as the visual portion and/or the markup portion. At step 714, the client 202 may receive an input (a voice input or other form of input) to create the step for the document, in response to which the client 202 may store (at a step 716) a data record for the step in a steps list for the document. The data record may include the HTML element(s) (or the DOM structure) for the portion of the application to be used as the visual portion and the HTML element for the interface element to be used as the markup portion.

At step 718, the client 202 may determine if there are more steps for the document to be recorded. The user may provide an input (e.g., a voice input, selection of a button in the document generation toolbox 502, or other form of input) indicating that there are more steps to be recorded, in which case the client 202 may return to step 706, where another voice input may be received. During this iteration of the routine 700, the client 202 may receive a voice input and store a data record for the next step (e.g., a second step) in the steps list for the document. In some implementations, the user 104 may select the "save/preview step" button 146 shown in FIG. 1F to indicate that the instant step is complete. In some implementations, the user 104 may select the "new step" button 144 shown in FIG. 1C to indicate that there are more steps to be included in the document, and that information provided subsequent to selecting of the "new step" button 144 is for a new/next step in the document.

The user 104 may provide an input (e.g., a voice input, selection of a button in the document generation toolbox 502, or other form of input) indicating that there are no more steps to be recorded for the document, in which case, the client 202, at step 720, may receive an input to create the document. For example, the user 104 may say "generate document", "steps finished" or "I don't have any more steps for the document." In another example, the user 104 may select the "generate document" button 147 shown in FIG. 1F, indicating that there are no more steps to include in the document. The client 202 may create the document according to the routine 1100 of FIG. 11.

The routine 1100 relates to generating step data for individual steps in the document using the data records stored in the steps list. Referring to FIG. 11, the client 202 may retrieve (at step 1102) the data record for a step (e.g., a first step) in the steps list. The client 202 may retrieve (at step 1104), from the stored data record, the HTML element(s) corresponding to the visual portion, and may identify (at step 1106) an attribute(s) of the HTML element(s) (e.g., CSS/style attributes defining how (e.g., color, font size, typeface, border, etc.) the HTML element is to be rendered for display) for the visual portion from the data record. Using the data record, the client 202 may identify (at step 1108) the interface element for the markup portion (from the HTML element(s) stored in the data record as markup portion per the step 610 of FIG. 6 or the step 710 of FIG. 7), and may determine (at step 1110) the type and name of the interface element for the markup portion. The type and name of the interface element may be determined using a tag(s) of the HTML element(s) stored in the data record. For example, an HTML element may be <button type="Submit">, using which the client 202 may determine the type to be "button" and the name to be "Submit". The client 202 may generate (at step 1112) the transcript portion for the step using the data record, and the type and name of the interface element for the markup portion. For example, if the interface element is a "submit" button, the type is button and the name is "submit", then the transcript portion may be "click the submit button." For another example, if the interface element is a "miscellaneous" tab, the type is tab and the name is "miscellaneous", then the transcript may be "select the miscellaneous tab." For yet another example, if the interface element is an "address" text field, the type is text field, the name is "address", then the transcript may be "provide input for the address text field" or "enter address in the address text field." The client 202 may use one or more templates, based on the interface element type, to generate the transcript portion. In some cases the data record for the step may include some part of the transcript portion, for example, provided via a voice input (as described in relation to FIG. 10), then the client 202 may include those parts in the transcript portion. The client 202 may store (at step 1114) step data for the step (in the document metadata 507 or the alternate data stream 508), where the step data includes the HTML element(s), the attribute(s) for the visual portion, the interface element for the markup portion, and the transcript portion. After the data record for a step is retrieved, the client 202, in some implementations, may update the steps list to indicate that the particular data record/step has been processed.

The client 202, may determine (at decision block 1116) if there are more steps in the step list to generate step data for. For example, the client 202 may query the steps list for generating the document, and may determine whether there are more data records for steps to be retrieved and processed per the steps 1102-1114. If yes, then the client 202 performs the routine 1100 again, and during this iteration the client 202 may generate step data for another step (e.g., a second step) in the steps list for the user guide document. If there are not more steps in the steps list to generate step data for, then the client 202 may generate the user guide document according to the routine 1200 of FIG. 12.

Referring to FIG. 12, the client 202 may receive (at step 1202) a selection of a user guide template. In some embodiments, various document templates may be presented to the user (for example, as template names, as snapshots or thumbnail images, etc.). A document template may define how the information is included in the document. For example, the document template may define how the visual portion and the transcript portion for a step are arranged. In one example template, the visual portion may be presented above the transcript portion, while in another example template, the transcript portion may be presented above the visual portion. The user guide template may also define a font style and a step numbering style. The document template may also, for example, indicate how a title, page numbering, and/or table of contents are included in the user guide document. If a user does not select a template, then a default template may be used in some embodiments. In some embodiments, the document template may be based on and related to the type of document to be generated, for example, a user guide template for generating a user guide for an application, a marketing template for generate a marketing/sales document for an application, etc.

The client 202 may start (at step 1204) a new DOM for the document by creating, for example, a WebView or root to host and load the DOM for the document. At this step, the DOM for the document may be empty. As described below, the DOM for the document may be loaded based on the step data for the steps in the user guide document. Thus, a DOM element may correspond to a step in the document, which may enable a user to update the document using its corresponding DOM.

The client 202 may retrieve (at step 1206) step data for a step (e.g., a first step) in the steps list, and may process the step data per steps 1208 and 1210 described here. In processing the step data (per the steps 1208 and 1210), the client 202 may extract information from the step data indicating which HTML elements are to be included in the visual portion for the step, and which HTML element to add the markup element to for the markup portion. The client 202 may append (at step 1208) the HTML element(s) for the visual portion for the step to the DOM for the document, while applying the attribute(s) stored in the step data. The client 202 may add (at step 1210), to the DOM for the document, a markup element surrounding the interface element stored in the step data, and may generate (at step 1212) an image using the HTML element(s) included in the DOM for the document that was generated per the foregoing steps. Using the HTML elements determined for the visual portion and the markup portion are determined, the client 202 may generate an image representing the visual portion 172 and the markup portion 174 for the step 170. The client 202 may use a software method included in an API of the specialized browser, embedded in the resource access application 424, that may be configured to generate an image using a DOM.

The client 202 may insert (at step 1214) the generated image and the transcript portion from the step data into the document as the step (e.g., the first step). Thus, the visual portion and the markup portion in the document is based on HTML elements representing the content of the document. The client 202 may add (at step 1216) metadata, based on the data record 190, 195, for the step in an alternate data stream 508 for the document. In other implementations, the client 202 may add metadata, based on the data record 190, 195, for the step to document metadata 507 for the document.

The client 202 may determine (at decision block 1218) if there are more steps in the steps list to process. The client 202 may query the steps list to determine whether there are more data records in the steps list to be retrieved and processed per the steps 1208 and 1210. If yes, then the client 202 processes step data for the next step (e.g., the second step) in the step list at step 1206. If there are no more steps in the step list, then the client 202 may store (at step 1220) the document. The document, in some embodiments, may be a Microsoft Word document, in which, images and transcript portions are inserted. In other embodiments, the document may be another type of file, for example, an Adobe pdf. In some implementations, the document may include information to be provided to a user in a message (e.g., an email, a SMS, a MMS, etc.) or a notification.

In some implementations, the client 202 may enable editing of an existing/stored document by a user that created the document or another user. The client 202 may obtain data (e.g., step data, title, table of contents, template, etc.), using the alternate data stream 508 or the document metadata 507, for the document 510 to be edited. Using the obtained data, the client 202 may load the document 510 as an editable webpage. User inputs editing the webpage may be translated (using industry-available solutions) into editing of the DOM and HTML elements representing the content of the document 510. After the user is done editing and saves the edited user guide document, the primary data stream 505, and the alternate data stream 508 or the document metadata 507 is updated (or new primary data stream, alternate data stream or document metadata is stored) reflecting the edits made by the user. The routine 1300 relates to how the document generation toolbox 502 can be used to update/edit a document that was generated as described above. Referring to FIG. 13, the client 202 may launch (step 1302) an instance of the document generation toolbox 502 in a similar manner as described above in relation to step 602. The user may select an update mode or function within the document generation toolbox 502, or may upload a document to the document generation toolbox 502 to indicate that the user wants to update the uploaded document. The client 202 may receive (at step 1304) a document for updating. At decision block 1306, the client 202 may determine if the format of the received document is valid for editing using the document generation toolbox 502. For example, the client 202 may determine if the document was generated using the document generation toolbox 502, and includes metadata for steps in the metadata 507 or the alternate data stream 508 (as shown in FIGS. 5A and 5B) of the document 510. A format of the document may be valid if the document generation toolbox 502 is able to access the metadata for the steps in the document, so that the content of the document may be rendered as elements that are editable using the document generation toolbox 502. As described above (in relation to at least FIGS. 5A and 5B), the metadata for the step may include HTML elements for the visual portion and markup portion for the step. If the format is invalid, then the document generation toolbox 502 may output (at step 1307) a message, indicating invalid format, to the user. If the format is valid, then the client 202 may load (at step 1308) the DOM, using the metadata included in the metadata 507 or the alternate data stream 508, for the document, and may display the visual portion(s), the markup element(s) and the transcript portion(s) for the steps in the document (at a step 1310). The visual portion(s) and the markup element(s) may be displayed in the embedded browser (in a separate window or tab).

The client 202 may activate (at a step 1312) event handlers to receive inputs updating the document. The client 202 may activate the event handlers at the specialized browser embedded in the resource access application 424 so that inputs received at the specialized browser are treated as inputs updating the document displayed at the specialized browser. The client 202 (at a step 1314) may receive one or more inputs updating the step data for the step(s) in the document. For example, the client 202 may receive an input updating the name of an interface element for the markup portion of the step. In another example, the client 202 may receive an input deselecting the interface element as the markup portion and causing the markup element surrounding the interface element to be removed. In yet another example, the client 202 may receive an input changing the color/shape of the markup element (e.g., change the markup element from a red rectangle or a green oval). In yet another example, the client 202 may receive an input updating the transcript portion. Using the inputs, the client 202 may update (at step 1316) the DOM for the document, and may store (at step 1318) the updated user guide document. In some embodiments, the user may also change the document template used to generate the document. The updated document may be generated in a similar manner as described in relation to FIG. 12, where step data for each step in the document is processed, an image is generated using the updated DOM for the step and inserted in the document along with the transcript portion (or updated transcript portion).

In some implementations, the client 202 may generate a document using images of portions of the application selected by the user to be included in the document. The application for which the user wants to generate the client 202 may be displayed (in the foreground) on the client device 202; the application may have been launched on the client device 202 without a web browser. The user may have also launched the client 202, which may be launched as an application on the client device 202 (instead of using a web browser), and may have enabled a recording function of the client 202, which may disable default interactions with the application.

Referring to FIG. 14, the client 202 may receive (at step 1402) a user input indicating displayed information is to be included for a step in a document. The user input may be a selection (e.g., using a click-and-drag input) of a portion of the application displayed at the client device 202. The user input at step 1402 may indicate the visual portion 172 for the step 170.

The client 202 may receive (at step 1404) a user input selecting an interface element for markup for the step. The user input may select (e.g., using a click or a click-and-drag) an interface element within the displayed information indicated at step 1402. The selected interface element may indicate the markup portion 174 for the step 170. In some implementations, the step 1404 may be performed prior to step 1402 (as in the user input selecting the interface element for the markup portion 174 may be provided prior to the user input indicating the displayed information for the visual portion 172).

The client 202 may generate (at step 1406) an image representing the displayed information and a markup element surrounding the selected interface element. The image may include the visual portion 172 and the markup portion 174 for the step 170. The client 202 may store (at step 1408) the image in the data record for the step 170, and may insert (at step 1410) the image, in a document, as corresponding to the step 170. In some implementations, the client 202 may also generate a transcript portion 176 for the step 170 using the displayed information and the selected interface element. The generated transcript portion 176 may be stored in the data record for the step 170, and may be inserted in the document as corresponding to the step 170. In some implementations, the image for the step may be inserted in the document based on the user 104 selecting the "save/preview step" button 146, shown in FIG. 1F, of the document generation toolbox 140. After the image for the step is inserted in the document, the "new step" button 144 may be deselected.

At decision block 1412, the client 202 determines if there are more steps to be included in the document. This determination may be based on receiving a user input, via the client 202, indicating whether or not there are more steps for the user guide document. For example, the user 104 may select the "new step" button 144, shown in the FIG. 1C, of the document generation toolbox 140 to indicate that the user 104 wants to provide inputs for another step in the document. In another example, the user 104 may provide a voice input (e.g., the user 104 may say "next step") to indicate that the user 104 wants to provide inputs for another step in the document. If there are more steps to be included in the document, then the client 202 may proceed to step 1402 and perform the routine 1400 to receive user inputs indicating a visual portion and a markup portion for the other steps to be included in the document.

If there are no more steps to be included in the document, then the client 202 may store (at step 1414) the document at the client device 202. In some implementations, step 1410 may be performed after the decision block 1412. For example, the data record for all the steps to be included in the document may be stored, then after a user input indicating that no more steps are to be included in the document, the client 202 may insert (step 1410) the images for the steps in the document.

In this manner, according to routine 1400, the client 202 enables a user to provide inputs indicating the visual portion 172 and the markup portion 174 for steps 170 for a document, and the client 202 automatically generates the document. This may provide an improved user experience in that the user does not have to repeatedly switch between an application and a document to create a step, copy (screenshot) a portion of the application, paste it in the document and draw a markup for an interface element.

F. Example Implementations of Methods, Systems, and Computer-Readable Media in Accordance with the Present Disclosure The following paragraphs (M1) through (M20) describe examples of methods that may be implemented in accordance with the present disclosure.

(M1) A method may involve a computing system receiving a first user input selecting at least a first element of an application, the first user input indicating that the first element corresponds to a first step in a sequence of steps to be represented in a document, storing a first record for the first step, the first record including at least a first sequence identifier and first data representing the first element, the first sequence identifier indicating a relative position of the first step within the sequence of steps, and generating the document at least in part by using the first data to generate a first visual portion for the first step, and using the first sequence identifier to determine a position of the first visual portion, in the document, relative to one or more other visual portions representing one or more other steps in the sequence of steps.

(M2) A method may be performed as described in paragraph (M1), and may further involve the computing system receiving a second user input selecting at least a second element of the application, the second user input indicating that the second element corresponds to a second step in the sequence of steps to be represented in the document, and storing a second record for the second step, the second record including at least a second sequence identifier and second data representing the second element, the second sequence identifier indicating a relative position of the second step within the sequence of steps, wherein generating the document further comprises generating the document using the second data to generate a second visual portion for the second step, and using the second sequence identifier to determine a position of the second visual portion, in the document, relative to at least the first visual portion.

(M3) A method may be performed as described in paragraph (M1) or paragraph (M2), and may further involve the computing system receiving a second user input indicating that the at least first element or a second element of the application is to be marked up for the first step, wherein the first record further includes second data representing a markup element for the first element or the second element, and wherein the first visual portion is generated using the first data and the second data, the first visual portion representing the markup element surrounding the first element or the second element.

(M4) A method may be performed as described in any of paragraphs (M1) through (M3), wherein the application is accessed using a web browser, wherein the first data includes a document object model (DOM) element corresponding to the first element, and wherein the first visual portion is an image generated using the DOM element.

(M5) A method may be performed as described in any of paragraphs (M1) through (M4), wherein the first data represents an image of a portion of the application within which the first element is displayed.

(M6) A method may be performed as described in any of paragraphs (M1) through (M5), and may further involve the computing system, prior to receiving the first user input, causing a document generation application to be launched in response to receiving a second user input, receiving a third user input activating a recording function of the document generation application, and disabling default interactions with the application in response to the recording function being activated.

(M7) A method may be performed as described in any of paragraphs (M1) through (M6), and may further involve the computing system receiving a voice input representing a description for the first step, processing the voice input to determine text data for the first step, and wherein the first record further includes the text data, and wherein generating the document further comprises generating the document using the text data to generate a transcript portion for the first step, and arranging the transcript portion adjacent to the first visual portion.

(M8) A method may be performed as described in any of paragraphs (M1) through (M7), and may further involve the computing system determining text data representing a description for the first step, the text data being based on a name of the first element and a type of the first element, wherein the first record further includes the text data, and wherein generating the document further comprises generating the document using the text data to generate a transcript portion for the first step, and arranging the transcript portion adjacent to the first visual portion.

(M9) A method may be performed as described in any of paragraphs (M1) through (M8), wherein the generated document is displayed via a web browser, and the method may further involve the computing system generating a DOM corresponding to contents of the generated document, the DOM including at least a first node representing the first visual portion for the first step, and a second node representing a second visual portion for a second step represented in the generated document.

(M10) A method may involve a computing system receiving a document representing a sequence of steps, receiving a first user input enabling an edit mode for the document, using a DOM corresponding to the document, displaying a visual portion for a step represented in the document, and receiving a second user input with respect to the visual portion. The method may further involve the computing system updating the DOM based on the second user input, generating an updated document by replacing the visual portion with an updated visual portion based on the updated DOM, and storing the updated document and the updated DOM.

(M11) A method may be performed as described in paragraph (M10), wherein the second input represents a change in a name of an interface element represented in the visual portion.

(M12) A method may be performed as described in paragraph (M10) or paragraph (M11), wherein the visual portion includes a markup element for an interface element, wherein the second input represents deselection of the interface element, and wherein updating the DOM comprises removing, from the DOM, a markup element for the interface element.

(M13) A method may be performed as described in any of paragraphs (M10) through (M12), wherein the visual portion includes a first markup element for a first interface element, wherein the second input represents selection of a second interface element represented in the visual portion, and wherein updating the DOM comprises removing the first markup element from the DOM, and adding, to the DOM, a second markup element for the second interface element.

(M14) A method may involve a computing system receiving a first user input selecting at least a first element of an application, the first user input indicating that the first element corresponds to a first step element in a sequence of steps to be represented in a document, identifying at least a first document object model (DOM) element representing the first element, storing a first record for the first step, the first record including the first DOM element and a first sequence identifier, the first sequence identifier indicating a relative position of the first step within the sequence of steps, and generating the document at least in part by using the first DOM element to generate a first visual portion for the first step, and using the first sequence identifier to determine a position of the first visual portion relative to one or more other visual portions representing one or more other steps in the sequence of steps.

(M15) A method may be performed as described in paragraph (M14), and may further involve the computing system receiving a second user input indicating that the first element or a second element of the application is to be marked up for the first step, wherein the first record further includes first data representing a markup element for the first element or the second element, and wherein the first visual portion is generated using the first DOM element and the first data, the first visual portion representing the markup element surrounding the first element or the second element.

(M16) A method may be performed as described in paragraph (M14) or paragraph (M15), and may further involve the computing system, prior to receiving the first user input, causing a document generation application to be launched in response to receiving a second user input, receiving a third user input activating a recording function of the document generation application, and disabling default interactions with the application in response to the recording function being activated.

(M17) A method may be performed as described in any of paragraphs (M14) through (M16), and may further involve the computing system receiving a voice input representing a description for the step, processing the voice input to determine text data for the step data, and wherein the first record further includes the text data, and wherein generation of the document further includes using the text data to generate a transcript portion for the first step, and arrange the transcript portion adjacent to the first visual portion.

(M18) A method may be performed as described in any of paragraphs (M14) through (M17), and may further involve the computing system determining text data representing a description for the first step, the text data being based on a name of the first element and a type of the first element, wherein the first record further includes the text data, and wherein generating the document further includes using the text data to generate a transcript portion for the first step, and arrange the transcript portion adjacent to the first visual portion.

(M19) A method may be performed as described in any of paragraphs (M14) through (M18), and may further involve the computing system generating a DOM corresponding to contents of the generated document, the DOM including at least a first node representing the first visual portion for the first step, and a second node representing a second visual portion for a second step represented in the generated document.

(M20) A method may be performed as described in any of paragraphs (M14) through (M19), and may further involve the computing system receiving a second user input enabling an edit mode for the generated document, displaying, using the DOM corresponding to the generated document, the first visual portion for the first step, receiving a third user input with respect to the first visual portion, updating the DOM based on the third user input, generating an updated document by replacing the first visual portion with an updated visual portion based on the updated DOM, and storing the updated document and the updated DOM.

The following paragraphs (S1) through (S20) describe examples of systems and devices that may be implemented in accordance with the present disclosure.

(S1) A system may comprise at least one processor and at least one computer-readable medium encoded with instructions which, when executed by the at least one processor, cause the system to receive a first user input selecting at least a first element of an application, the first user input indicating that the first element corresponds to a first step in a sequence of steps to be represented in a document, store a first record for the first step, the first record including at least a first sequence identifier and first data representing the first element, the first sequence identifier indicating a relative position of the first step within the sequence of steps, and generate the document at least in part by using the first data to generate a first visual portion for the first step, and using the first sequence identifier to determine a position of the first visual portion, in the document, relative to one or more other visual portions representing one or more other steps in the sequence of steps.

(S2) A system may be configured as described in paragraph (S1), wherein the at least one computer-readable medium is further encoded with additional instructions which, when executed by the at least one processor, further cause the system to receive a second user input selecting at least a second element of the application, the second user input indicating that the second element corresponds to a second step in the sequence of steps to be represented in the document, and store a second record for the second step, the second record including at least a second sequence identifier and second data representing the second element, the second sequence identifier indicating a relative position of the second step within the sequence of steps, wherein generation of the document further comprises using the second data to generate a second visual portion for the second step, and using the second sequence identifier to determine a position of the second visual portion, in the document, relative to at least the first visual portion.

(S3) A system may be configured as described in paragraph (S1) or paragraph (S2), wherein the at least one computer-readable medium is further encoded with additional instructions which, when executed by the at least one processor, further cause the system to receive a second user input indicating that the at least first element or a second element of the application is to be marked up for the first step, wherein the first record further includes second data representing a markup element for the first element or the second element, and wherein the first visual portion is generated using the first data and the second data, the first visual portion representing the markup element surrounding the first element or the second element.

(S4) A system may be configured as described in any of paragraphs (S1) through (S3), wherein the application is accessed using a web browser, wherein the first data includes a document object model (DOM) element corresponding to the first element, and wherein the first visual portion is an image generated using the DOM element.

(S5) A system may be configured as described in any of paragraphs (S1) through (S4), wherein the first data represents an image of a portion of the application within which the first element is displayed.

(S6) A system may be configured as described in any of paragraphs (S1) through (S5), wherein the at least one computer-readable medium is further encoded with additional instructions which, when executed by the at least one processor, further cause the system to, prior to receiving the first user input, cause a document generation application to be launched in response to receiving a second user input, receive a third user input activating a recording function of the document generation application, and disable default interactions with the application in response to the recording function being activated.

(S7) A system may be configured as described in any of paragraphs (S1) through (S6), wherein the at least one computer-readable medium is further encoded with additional instructions which, when executed by the at least one processor, further cause the system to receive a voice input representing a description for the first step, process the voice input to determine text data for the first step, and wherein the first record further includes the text data, and wherein generation of the document further comprises using the text data to generate a transcript portion for the first step, and arranging the transcript portion adjacent to the first visual portion.

(S8) A system may be configured as described in any of paragraphs (S1) through (S7), wherein the at least one computer-readable medium is further encoded with additional instructions which, when executed by the at least one processor, further cause the system to determine text data representing a description for the first step, the text data being based on a name of the first element and a type of the first element, wherein the first record further includes the text data, and wherein generation of the document further comprises using the text data to generate a transcript portion for the first step, and arranging the transcript portion adjacent to the first visual portion.

(S9) A system may be configured as described in any of paragraphs (S1) through (S8), wherein the generated document is displayed via a web browser, and the method may further involve the computing system generating a DOM corresponding to contents of the generated document, the DOM including at least a first node representing the first visual portion for the first step, and a second node representing a second visual portion for a second step represented in the generated document.

(S10) A system may comprise at least one processor, and at least one computer-readable medium encoded with instructions which, when executed by the at least one processor, cause the system to receive a document representing a sequence of steps, receive a first user input enabling an edit mode for the document, using a DOM corresponding to the document, display a visual portion for a step represented in the document, and receive a second user input with respect to the visual portion. The instructions may further cause the system to update the DOM based on the second user input, generate an updated document by replacing the visual portion with an updated visual portion based on the updated DOM, and store the updated document and the updated DOM.

(S11) A system may be configured as described in paragraph (S10), wherein the second input represents a change in a name of an interface element represented in the visual portion.

(S12) A system may be configured as described in paragraph (S10) or paragraph (S11), wherein the visual portion includes a markup element for an interface element, wherein the second input represents deselection of the interface element, and wherein updating the DOM comprises removing, from the DOM, a markup element for the interface element.

(S13) A system may be configured as described in any of paragraphs (S10) through (S12), wherein the visual portion includes a first markup element for a first interface element, wherein the second input represents selection of a second interface element represented in the visual portion, and wherein updating the DOM comprises removing the first markup element from the DOM, and adding, to the DOM, a second markup element for the second interface element.

(S14) A system may comprise at least one processor, and at least one computer-readable medium encoded with instructions which, when executed by the at least one processor, cause the system to receive a first user input selecting at least a first element of an application, the first user input indicating that the first element corresponds to a first step element in a sequence of steps to be represented in a document, identify at least a first document object model (DOM) element representing the first element, store a first record for the first step, the first record including the first DOM element and a first sequence identifier, the first sequence identifier indicating a relative position of the first step within the sequence of steps, and generate the document at least in part by using the first DOM element to generate a first visual portion for the first step, and using the first sequence identifier to determine a position of the first visual portion relative to one or more other visual portions representing one or more other steps in the sequence of steps.

(S15) A system may be configured as described in paragraph (S14), wherein the at least one computer-readable medium is further encoded with additional instructions which, when executed by the at least one processor, further cause the system to receive a second user input indicating that the first element or a second element of the application is to be marked up for the first step, wherein the first record further includes first data representing a markup element for the first element or the second element, and wherein the first visual portion is generated using the first DOM element and the first data, the first visual portion representing the markup element surrounding the first element or the second element.

(S16) A system may be configured as described in paragraph (S14) or paragraph (S15), wherein the at least one computer-readable medium may be encoded with additional instructions which, when executed by the at least one processor, may further cause the system to, prior to receiving the first user input, cause a document generation application to be launched in response to receiving a second user input, receive a third user input activating a recording function of the document generation application, and disable default interactions with the application in response to the recording function being activated.

(S17) A system may be configured as described in any of paragraphs (S14) through (S16), wherein the at least one computer-readable medium may be encoded with additional instructions which, when executed by the at least one processor, may further cause the system to receive a voice input representing a description for the step, process the voice input to determine text data for the step data, and wherein the first record further includes the text data, and wherein generation of the document further includes using the text data to generate a transcript portion for the first step, and arrange the transcript portion adjacent to the first visual portion.

(S18) A system may be configured as described in any of paragraphs (S14) through (S17), wherein the at least one computer-readable medium may be encoded with additional instructions which, when executed by the at least one processor, may further cause the system to determine text data representing a description for the first step, the text data being based on a name of the first element and a type of the first element, wherein the first record further includes the text data, and wherein generation of the document further includes using the text data to generate a transcript portion for the first step, and arrange the transcript portion adjacent to the first visual portion.

(S19) A system may be configured as described in any of paragraphs (S14) through (S18), wherein the at least one computer-readable medium may be encoded with additional instructions which, when executed by the at least one processor, may further cause the system to generate a DOM corresponding to contents of the generated document, the DOM including at least a first node representing the first visual portion for the first step, and a second node representing a second visual portion for a second step represented in the generated document.

(S20) A system may be configured as described in any of paragraphs (S14) through (S19), wherein the at least one computer-readable medium may be encoded with additional instructions which, when executed by the at least one processor, may further cause the system to receive a second user input enabling an edit mode for the generated document, display, using the DOM corresponding to the generated document, the first visual portion for the first step, receive a third user input with respect to the first visual portion, update the DOM based on the third user input, generate an updated document by replacing the first visual portion with an updated visual portion based on the updated DOM, and store the updated document and the updated DOM.

The following paragraphs (CRM1) through (CRM20) describe examples of computer-readable media that may be configured in accordance with the present disclosure.

(CRM1) At least one non-transitory, computer-readable medium may be encoded with instructions which, when executed by at least one processor included in a system, cause the system to receive a first user input selecting at least a first element of an application, the first user input indicating that the first element corresponds to a first step in a sequence of steps to be represented in a document, store a first record for the first step, the first record including at least a first sequence identifier and first data representing the first element, the first sequence identifier indicating a relative position of the first step within the sequence of steps, and generate the document at least in part by using the first data to generate a first visual portion for the first step, and using the first sequence identifier to determine a position of the first visual portion, in the document, relative to one or more other visual portions representing one or more other steps in the sequence of steps.

(CRM2) At least one computer-readable medium may be configured as described in paragraph (CRM1), and may further be encoded with additional instructions which, when executed by the at least one processor, may further cause the system to a receive a second user input selecting at least a second element of the application, the second user input indicating that the second element corresponds to a second step in the sequence of steps to be represented in the document, and store a second record for the second step, the second record including at least a second sequence identifier and second data representing the second element, the second sequence identifier indicating a relative position of the second step within the sequence of steps, wherein generation of the document further comprises using the second data to generate a second visual portion for the second step, and using the second sequence identifier to determine a position of the second visual portion, in the document, relative to at least the first visual portion.

(CRM3) At least one computer-readable medium may be configured as described in paragraph (CRM1) or paragraph (CRM2), and may further be encoded with additional instructions which, when executed by the at least one processor, may further cause the system to receive a second user input indicating that the at least first element or a second element of the application is to be marked up for the first step, wherein the first record further includes second data representing a markup element for the first element and the second element, and wherein the first visual portion is generated using the first data and the second data, the first visual portion representing the markup element surrounding the first element or the second element.

(CRM4) At least one computer-readable medium may be configured as described in any of paragraphs (CRM1) through (CRM3), wherein the application is accessed using a web browser, wherein the first data includes a document object model (DOM) element corresponding to the first element, and wherein the first visual portion is an image generated using the DOM element.

(CRM5) At least one computer-readable medium may be configured as described in any of paragraphs (CRM1) through (CRM4), wherein the first data represents an image of a portion of the application within which the first element is displayed.

(CRM6) At least one computer-readable medium may be configured as described in any of paragraphs (CRM1) through (CRM5), and may further be encoded with additional instructions which, when executed by the at least one processor, may further cause the system to, prior to receiving the first user input, cause a document generation application to be launched in response to receiving a second user input, receive a third user input activating a recording function of the document generation application, and disable default interactions with the application in response to the recording function being activated.

(CRM7) At least one computer-readable medium may be configured as described in any of paragraphs (CRM1) through (CRM6), and may further be encoded with additional instructions which, when executed by the at least one processor, may further cause the system to receive a voice input representing a description for the first step, process the voice input to determine text data for the first step, and wherein the first record further includes the text data, and wherein generation of the document further comprises using the text data to generate a transcript portion for the first step, and arranging the transcript portion adjacent to the first visual portion.

(CRM8) At least one computer-readable medium may be configured as described in any of paragraphs (CRM1) through (CRM7), and may further be encoded with additional instructions which, when executed by the at least one processor, may further cause the system to determine text data representing a description for the first step, the text data being based on a name of the first element and a type of the first element, wherein the first record further includes the text data, and wherein generation of the document further comprises using the text data to generate a transcript portion for the first step, and arranging the transcript portion adjacent to the first visual portion.

(CRM9) At least one computer-readable medium may be configured as described in any of paragraphs (CRM1) through (CRM8), wherein the generated document is displayed via a web browser, and the method may further involve the computing system generating a DOM corresponding to contents of the generated document, the DOM including at least a first node representing the first visual portion for the first step, and a second node representing a second visual portion for a second step represented in the generated document.

(CRM10) At least one non-transitory, computer-readable medium may be encoded with instructions which, when executed by at least one processor included in a system, cause the system to receive a document representing a sequence of steps, receive a first user input enabling an edit mode for the document, using a DOM corresponding to the document, display a visual portion for a step represented in the document, and receive a second user input with respect to the visual portion. The instructions may further cause the system to update the DOM based on the second user input, generate an updated document by replacing the visual portion with an updated visual portion based on the updated DOM, and store the updated document and the updated DOM.

(CRM11) At least one computer-readable medium may be configured as described in paragraph (CRM10), wherein the second input represents a change in a name of an interface element represented in the visual portion.

(CRM12) At least one computer-readable medium may be configured as described in paragraph (CRM10) or paragraph (CRM11), wherein the visual portion includes a markup element for an interface element, wherein the second input represents deselection of the interface element, and wherein updating the DOM comprises removing, from the DOM, a markup element for the interface element.

(CRM13) At least one computer-readable medium may be configured as described in any of paragraphs (CRM10) through (CRM12), wherein the visual portion includes a first markup element for a first interface element, wherein the second input represents selection of a second interface element represented in the visual portion, and wherein updating the DOM comprises removing the first markup element from the DOM, and adding, to the DOM, a second markup element for the second interface element.

(CRM14) At least one non-transitory, computer-readable medium may be encoded with instructions which, when executed by at least one processor included in a system, cause the system to receive a first user input selecting at least a first element of an application, the first user input indicating that the first element corresponds to a first step element in a sequence of steps to be represented in a document, identify at least a first document object model (DOM) element representing the first element, store a first record for the first step, the first record including the first DOM element and a first sequence identifier, the first sequence identifier indicating a relative position of the first step within the sequence of steps, and generate the document at least in part by using the first DOM element to generate a first visual portion for the first step, and using the first sequence identifier to determine a position of the first visual portion relative to one or more other visual portions representing one or more other steps in the sequence of steps.

(CRM15) At least one computer-readable medium may be configured as described in paragraph (CRM14), and may further be encoded with additional instructions which, when executed by the at least one processor, may further cause the system to receive a second user input further indicates that the first element or a second element of the application is to be marked up for the first step, wherein the first record further includes first data representing a markup element for the first element or the second element, and wherein the first visual portion is generated using the first DOM element and the first data, the first visual portion representing the markup element surrounding the first element or the second element.

(CRM16) At least one computer-readable medium may be configured as described in paragraph (CRM14) or paragraph (CRM15), and may further be encoded with additional instructions which, when executed by the at least one processor, may further cause the system to, prior to receiving the first user input, cause a document generation application to be launched in response to receiving a second user input, receive a third user input activating a recording function of the document generation application, and disable default interactions with the application in response to the recording function being activated.

(CRM17) At least one computer-readable medium may be configured as described in any of paragraphs (CRM14) through (CRM16), and may further be encoded with additional instructions which, when executed by the at least one processor, may further cause the system to receive a voice input representing a description for the step, process the voice input to determine text data for the step data, and wherein the first record further includes the text data, and wherein generation of the document further includes using the text data to generate a transcript portion for the first step, and arrange the transcript portion adjacent to the first visual portion.

(CRM18) At least one computer-readable medium may be configured as described in any of paragraphs (CRM14) through (CRM17), and may further be encoded with additional instructions which, when executed by the at least one processor, may further cause the system to determine text data representing a description for the first step, the text data being based on a name of the first element and a type of the first element, wherein the first record further includes the text data, and wherein generation of the document further includes using the text data to generate a transcript portion for the first step, and arrange the transcript portion adjacent to the first visual portion.

(CRM19) At least one computer-readable medium may be configured as described in any of paragraphs (CRM14) through (CRM18), and may further be encoded with additional instructions which, when executed by the at least one processor, may further cause the system to generate a DOM corresponding to contents of the generated document, the DOM including at least a first node representing the first visual portion for the first step, and a second node representing a second visual portion for a second step represented in the generated document.

(CRM20) At least one computer-readable medium may be configured as described in any of paragraphs (CRM14) through (CRM19), and may further be encoded with additional instructions which, when executed by the at least one processor, may further cause the system to receive a second user input enabling an edit mode for the generated document, display, using the DOM corresponding to the generated document, the first visual portion for the first step, receive a third user input with respect to the first visual portion, update the DOM based on the third user input, generate an updated document by replacing the first visual portion with an updated visual portion based on the updated DOM, and store the updated document and the updated DOM.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising,"

or "having," "containing," "involving," and variations thereof herein, is meant to encompass the items listed thereafter and equivalents thereof as well as additional items.

What is claimed is:

1. A method, comprising:

causing, by a computing system, first output content of an application to be displayed, wherein the first output content includes at least a first user interface element, and the application is configured to perform a first action in response to selection of the first user interface element;

receiving, by the computing system and while the first output content is being displayed, a first user input indicating that a first step in a sequence of steps is to be recorded for inclusion in a document relating to the application;

in response to the first user input, precluding the application from performing the first action in response to selection of the first user interface element;

receiving, by the computing system and while the application is precluded from performing the first action in response to selection of the first user interface element, a second user input selecting the first user interface element;

storing, by the computing system and based at least in part on receipt of the second user input while the application was precluded from performing the first action in response to selection of the first user interface element, a first record for the first step, the first record including at least a first sequence identifier, first data representing the first user interface element, the first sequence identifier indicating a relative position of the first step within the sequence of steps;

after receiving the second user input, enabling the application to perform the first action in response to selection of the first user interface element; and generating, by the computing system, the document at least in part by using the first data to generate a first visual portion for the first step, using the first sequence identifier to determine a position of the first visual portion, in the document, relative to one or more other visual portions representing one or more other steps in the sequence of steps.

2. The method of claim 1, further comprising:

after enabling the application to perform the first action in response to selection of the first user interface element, receiving, by the computing system, a third user input selecting the first user interface element;

in response to receipt of the third user input, causing the application to perform the first action;

based at least in part on performance of the first action by the application, causing the computing system to display second output content, wherein the second output content includes at least a second user interface element, and the application is configured to perform a second action in response to selection of the second user interface element;

receiving, by the computing system and while the second output content is being displayed, a fourth user input indicating that a second step in a sequence of steps is to be recorded for inclusion in the document;

in response to the fourth user input, precluding the application from performing the second action in response to selection of the second user interface element;

receiving, by the computing system, a fifth user input selecting the;

storing, by the computing system and based at least in part on receipt of the fifth user input while the application was precluded from performing the second action in response to selection of the second user interface element, a second record for the second step, the second record including at least a second sequence identifier and second data representing the second user interface element, the second sequence identifier indicating a relative position of the second step within the sequence of steps; and after receiving the fifth user input, enabling the application to perform the second action in response to selection of the second user interface element;

wherein generating, by the computing system, the document further comprises generating the document using the second data to generate a second visual portion for the second step, and using the second sequence identifier to determine a position of the second visual portion, in the document, relative to at least the first visual portion.

3. The method of claim 1, further comprising:

receiving a third user input indicating that the first user interface element or a second user interface element included in the first output content is to be marked up for the first step;

wherein the first record further includes second data representing a markup element for the first user interface element or the second user interface element, and wherein the first visual portion is generated using the first data and the second data, the first visual portion representing the markup element surrounding the first user interface element or the second user interface element.

4. The method of claim 1, wherein:

the application is accessed using a web browser;

the first data includes a representation of a document object model (DOM) element corresponding to the first user interface element; and the first visual portion includes an image generated using the DOM element.

5. The method of claim 1, wherein the first data includes a representation of an image of a portion of the first output content within which the first user interface element is displayed.

6. The method of claim 1, further comprising prior to receiving the first user input:

causing, by the computing system, a document generation application to be launched; and causing, by the document generation application, a user interface to be displayed in association with the first output content, the user interface including a third user interface element that is selectable to enable a user to provide the first user input to the computing system.

7. The method of claim 1, further comprising:

receiving, by the computing system, a voice input representing a description for the first step; and processing, by the computing system, the voice input to determine text data for the first step;

wherein the first record further includes the text data, and wherein generating the document further comprises generating the document using the text data to generate a transcript portion for the first step, and arranging the transcript portion adjacent the first visual portion.

8. The method of claim 1, further comprising:

determining, by the computing system, text data representing a description for the first step, the text data being based on a name of the first user interface element and a type of the first user interface element;

wherein the first record further includes the text data, and
wherein generating the document further comprises generating the document using the text data to generate a transcript portion for the first step, and arranging the transcript portion adjacent to the first visual portion in the document.

9. The method of claim 1, wherein the document is displayed via a web browser, and the method further comprises:
generating, by the computing system, a DOM corresponding to contents of the document, the DOM including at least a first node representing the first visual portion for the first step, and a second node representing a second visual portion for a second step represented in the document.

10. The method of claim 1, further comprising:
receiving, by the computing system, a third user input enabling an edit mode for the document;
using a DOM corresponding to the document, displaying, by the computing system, the first visual portion for the first step;
receiving, by the computing system, a fourth user input with respect to the first visual portion;
updating, by the computing system, the DOM based on the fourth user input to generate an updated DOM;
generating, by the computing system, an updated document by replacing the first visual portion with an updated visual portion based on the updated DOM; and
storing, by the computing system, the updated document.

11. The method of claim 10, wherein the fourth user input represents a change in a name of the first user interface element represented in the first visual portion.

12. The method of claim 10, wherein:
the first visual portion includes a markup element for the first user interface element;
the fourth user input represents deselection of the first user interface element; and
updating the DOM comprises removing, from the DOM, the markup element for the first user interface element.

13. The method of claim 10, wherein:
the first visual portion includes a first markup element for the first user interface element;
the fourth user input represents selection of a second user interface element represented in the first visual portion; and
updating the DOM comprises:
removing the first markup element from the DOM, and
adding, to the DOM, a second markup element for the second user interface element.

14. A system, comprising:
at least one processor; and
at least one computer-readable medium encoded with instructions which, when executed by the at least one processor, cause the system to:
cause first output content of an application to be displayed, wherein the first output content includes at least a first user interface element, and the application is configured to perform a first action in response to selection of the first user interface element;
receive, while the first output content is being displayed, a first user input indicating that a first step in a sequence of steps is to be recorded for inclusion in a document relating to the application;
in response to the first user input, precluding the application from performing the first action in response to selection of the first user interface element;
receive, while the application is precluded from performing the first action in response to selection of the first user interface element, a second user input selecting the first user interface element;
identify at least a first document object model (DOM) element representing the first user interface element;
store, based at least in part on receipt of the second user input while the application was precluded from performing the first action in response to selection of the first user interface element, a first record for the first step, the first record including the first DOM element, a first sequence identifier, the first sequence identifier indicating a relative position of the first step within the sequence of steps;
after receiving the second user input, enable the application to perform the first action in response to selection of the first user interface element; and
generate the document at least in part by using the first DOM element to generate a first visual portion for the first step, using the first sequence identifier to determine a position of the first visual portion relative to one or more other visual portions representing one or more other steps in the sequence of steps.

15. The system of claim 14, wherein the at least one computer-readable medium is further encoded with additional instructions which, when executed by the at least one processor, further cause the system to:
receive a third user input indicating that the first user interface element or a second user interface element included in the first output content is to be marked up for the first step;
wherein the first record further includes first data representing a markup element for the first user interface element or the second user interface element, and
wherein the first visual portion is generated using the first DOM element and the first data, the first visual portion representing the markup element surrounding the first user interface element or the second user interface element.

16. The system of claim 14, wherein the at least one computer-readable medium is further encoded with additional instructions which, when executed by the at least one processor, further cause the system to, prior to receiving the first user input:
cause a document generation application to be launched; and
cause, by the document generation application, a user interface to be displayed in association with the first output content, the user interface including a third user interface element that is selectable to enable a user to provide the first user input to the system.

17. The system of claim 14, wherein the at least one computer-readable medium is further encoded with additional instructions which, when executed by the at least one processor, further cause the system to:
receive a voice input representing a description for the first step; and
process the voice input to determine text data for the first step;
wherein the first record further includes the text data, and
wherein generation of the document further includes using the text data to generate a transcript portion for the first step, and arranging the transcript portion adjacent the first visual portion.

18. The system of claim 14, wherein the at least one computer-readable medium is further encoded with additional instructions which, when executed by the at least one processor, further cause the system to:
determine text data representing a description for the first step, the text data being based on a name of the first user interface element and a type of the first user interface element;
wherein the first record further includes the text data, and
wherein generation of the document further includes using the text data to generate a transcript portion for the first step, and arranging the transcript portion adjacent the first visual portion in the document.

19. The system of claim 14, wherein the at least one computer-readable medium is further encoded with additional instructions which, when executed by the at least one processor, further cause the system to:
generate a DOM corresponding to contents of the document, the DOM including at least a first node representing the first visual portion for the first step, and a second node representing a second visual portion for a second step represented in the document.

20. The system of claim 19, wherein the at least one computer-readable medium is further encoded with additional instructions which, when executed by the at least one processor, further cause the system to:
receive a third user input enabling an edit mode for the document;
display, using the DOM, the first visual portion for the first step;
receive a fourth user input with respect to the first visual portion;
update the DOM based on the fourth user input to generate an updated DOM;
generate an updated document by replacing the first visual portion with an updated visual portion based on the updated DOM; and
store the updated document and the updated DOM.

* * * * *